(12) United States Patent
Steelberg et al.

(10) Patent No.: US 8,583,693 B2
(45) Date of Patent: Nov. 12, 2013

(54) SYSTEM AND METHOD FOR CREATING AND MARKETING AUTHENTIC VIRTUAL MEMORABILIA

(75) Inventors: Ryan Steelberg, Irvine, CA (US); Chad Steelberg, Newport Beach, CA (US)

(73) Assignee: Brand Affinity Technologies, Inc., Irvine, CA (US)

( * ) Notice: Subject to any disclaimer, the term of this patent is extended or adjusted under 35 U.S.C. 154(b) by 0 days.

(21) Appl. No.: 12/950,236

(22) Filed: Nov. 19, 2010

(65) Prior Publication Data

US 2011/0107433 A1 May 5, 2011

Related U.S. Application Data

(63) Continuation-in-part of application No. 12/712,637, filed on Feb. 25, 2010, now abandoned, and a continuation-in-part of application No. 12/533,499, filed on Jul. 31, 2009, which is a continuation-in-part of application No. 12/220,907, filed on Jul. 29, 2008, and a continuation-in-part of application No. 12/332,940, filed on Dec. 11, 2008, now abandoned, said application No. 12/220,907 is a continuation-in-part of application No. 12/144,194, filed on Jun. 23, 2008, which is a continuation-in-part of application No. 11/981,646, filed on Oct. 31, 2007, and a continuation-in-part of application No. 11/981,837, filed on Oct. 31, 2007, now Pat. No. 7,809,603, and a continuation-in-part of application No. 12/072,692, filed on Feb. 27, 2008, and a continuation-in-part of application No. 12/079,769, filed on Mar. 27, 2008, and a continuation-in-part of application No. 12/042,913, filed on Mar. 5, 2008, which is a continuation-in-part of application No. 12/072,692, filed on Feb. 27, 2008, which is a continuation-in-part of application No. 11/981,646, filed on Oct. 31, 2007.

(60) Provisional application No. 61/085,084, filed on Jul. 31, 2008, provisional application No. 61/065,297, filed on Feb. 7, 2008, provisional application No. 61/065,297, filed on Feb. 7, 2008, provisional application No. 61/131,386, filed on Jun. 6, 2008, provisional application No. 60/993,096, filed on Sep. 7, 2007.

(51) Int. Cl.
*G06F 7/00* (2006.01)
*G06F 17/30* (2006.01)
*G06F 17/00* (2006.01)

(52) U.S. Cl.
USPC .......................... 707/796; 707/802; 707/944

(58) Field of Classification Search
USPC ................... 707/781, 999.001–999.005, 796
See application file for complete search history.

(56) References Cited

U.S. PATENT DOCUMENTS 6,182,218 B1 * 1/2001 Saito ............................ 713/176
6,381,510 B1 * 4/2002 Amidhozour et al. ........ 700/130
(Continued)

*Primary Examiner* — Kannan Shanmugasundaram
(74) *Attorney, Agent, or Firm* — Barnes & Thornburg LLP; Thomas J. McWilliams; Edward F. Behm, Jr.

(57) ABSTRACT

An advertising engine, system and method of using is described. The engine includes at least one vault including a plurality of media assets, a recommendation engine that matches at least one media asset from the vault with at least one requested creative, a delivery engine that integrates the requested creative with the matched media assets from the vault, and a management engine that regulates and/or tracks ones of the at least one media asset.

9 Claims, 24 Drawing Sheets

(56) References Cited

U.S. PATENT DOCUMENTS

| | | | |
|---|---|---|---|
| 6,735,324 B1* | 5/2004 | McKinley et al. | 382/100 |
| 7,697,713 B1* | 4/2010 | Verhoeven et al. | 382/100 |
| 2002/0092019 A1* | 7/2002 | Marcus | 725/37 |
| 2002/0178363 A1* | 11/2002 | Ambrogio et al. | 713/176 |
| 2003/0023598 A1* | 1/2003 | Janakiraman et al. | 707/10 |
| 2003/0220885 A1* | 11/2003 | Lucarelli et al. | 705/64 |
| 2004/0071311 A1* | 4/2004 | Choi et al. | 382/100 |
| 2006/0293103 A1* | 12/2006 | Mendelsohn | 463/42 |
| 2007/0143181 A1* | 6/2007 | Linkner et al. | 705/14 |
| 2007/0150353 A1* | 6/2007 | Krassner et al. | 705/14 |

* cited by examiner

Register

For full access to BAT services we encourage you to register with us by clicking on the "Get Started" button below. For a quick demonstration of the BAT application, please provide your email then click on the "Demo" button.

Email:
Password:

Register!

SYSTEM AND METHOD FOR CREATING AND MARKETING AUTHENTIC VIRTUAL MEMORABILIA

CROSS REFERENCE TO RELATED APPLICATIONS

The present application is a continuation-in-part of U.S. patent application Ser. No. 12/712,637 entitled "System and Method for Creating and Marketing Authentic Virtual Memorabilia," filed Feb. 25, 2010, and is a continuation-in-part of U.S. patent application Ser. No. 12/533,499, entitled "Engine, System And Method For Generation Of Brand Affinity Content," filed Jul. 31, 2009, the entire disclosures of which are incorporated by reference herein as if set forth in their entirety.

U.S. patent application Ser. No. 12/712,637 entitled "System and Method for Creating and Marketing Authentic Virtual Memorabilia," filed Feb. 25, 2010, claims priority to U.S. Provisional Application No. 61/024,306 entitled "System and Method for Creating and Marketing Authentic Virtual Memorabilia," filed Jan. 29, 2008, the entire disclosure of which is incorporated by reference herein as if set forth in its entirety.

U.S. patent application Ser. No. 12/533,499, entitled "Engine, System And Method For Generation Of Brand Affinity Content," filed Jul. 31, 2009 claims priority to U.S. Provisional Application Ser. No. 61/085,084, entitled "Engine, System and Method For Generation of Brand Affinity Content", filed Jul. 31, 2008, and is a continuation-in-part of both U.S. patent application Ser. No. 12/220,907, entitled "Apparatus, System and Method For a Brand Affinity Engine With Delivery Tracking and Statistics", filed Jul. 29, 2008, and Ser. No. 12/332,940, entitled "System and Method of Assessing Qualitative and Quantitative Use of a Brand", filed Feb. 9, 2009, which claims priority to U.S. Provisional Application Ser. No. 61/065,297, entitled "System and Method of Assessing Qualitative and Quantitative Use of a Brand", filed Feb. 7, 2008, the entire disclosures of which are incorporated by reference herein as if set forth in their entirety.

U.S. patent application Ser. No. 12/220,907: is a continuation-in-part of U.S. patent application Ser. No. 12/144,194, entitled "System and Method for Brand Affinity Content Distribution and Optimization", filed Jun. 23, 2008; claims priority to U.S. Provisional Patent Application Ser. No. 61/065,297, entitled "System and Method of Assessing Qualitative and Quantitative Use of a Brand," filed Feb. 7, 2008; and claims priority to U.S. Provisional Patent Application Ser. No. 61/131,386, entitled "Apparatus, System and Method for a Brand Affinity Engine Using Positive and Negative Mentions", filed Jun. 6, 2008, the disclosures of which are incorporated by reference herein as if set forth in their entirety.

U.S. patent application Ser. No. 12/144,194 is: a continuation-in-part of U.S. patent application Ser. No. 11/981,646, entitled "Engine, System and Method for Generation of Brand Affinity Content", filed Oct. 31, 2007; a continuation-in-part of U.S. patent application Ser. No. 11/981,837, entitled "An Advertising Request And Rules-Based Content Provision Engine, System and Method", filed Oct. 31, 2007; a continuation-in-part of U.S. patent application Ser. No. 12/072,692, entitled "Engine, System and Method For Generation of Brand Affinity Content, filed Feb. 27, 2008; and a continuation in part of U.S. patent application Ser. No. 12/079,769, entitled "Engine, System and Method for Generation of Brand. Affinity Content," filed Mar. 27, 2008, the disclosures of which are incorporated by reference herein as if set forth in their entirety.

U.S. patent application Ser. No. 11/981,837 claims priority to U.S. Provisional Application Ser. No. 60/993,096, entitled "System and Method for Rule-Based Generation of Brand Affinity Content," filed Sep. 7, 2007, and is related to U.S. patent application Ser. No. 11/981,646, the disclosures of which are incorporated by reference herein as if set forth in their entirety.

U.S. patent application Ser. No. 12/079,769 is a continuation-in-part of U.S. patent application Ser. No. 12/042,913, entitled "Engine, System and Method for Generation of Brand Affinity Content," filed Mar. 5, 2008, which is also a continuation-in-part of U.S. patent application Ser. No. 12/072,692, the disclosures of which are incorporated by reference herein as if set forth in their entirety.

U.S. patent application Ser. No. 12/072,692 is a continuation-in-part of U.S. patent application Ser. No. 11/981,646.

FIELD OF THE INVENTION

The present invention is directed to a system and method for branding and advertising, and more particularly, to an engine for accessing and generating brand affinity content, and methods of making and using the same.

BACKGROUND OF THE INVENTION

High impact advertising is that advertising that best grabs the attention of a targeted consumer. A target consumer is typically identified as the ideal customer for the particular good or service being advertised. This identification can arise from factors such as socio-economics, moral or value bases, age, gender, geography, interest levels or other perspective. The impact on an ideal customer of any particular advertisement may be improved if an advertisement includes endorsements, sponsorships, or affiliations from those persons, entities, or the like from whom the ideal target consumer has an increased likeliness to identify with, seek guidance from, or gain an increased sense of empowerment. Factors that will increase the impact of an endorser include the endorser's perceived knowledge of particular goods, the fame or popularity of the endorser, the respect typically accorded a particular endorser or sponsor, and other similar factors.

Consequently, the highest impact advertising time or block available for sale will generally be time that is associated, such as both within the advertisement and within the program with which the advertisement is associated, with an endorser most likely to have high impact on the ideal target customer. However, the existing art makes little use of this advertising reality.

Thus, there exists a need for an engine, system and method that allows for brand development and the obtaining of an endorsement or sponsorship from specific individuals, entities, brands, marketing partners, or sponsors.

SUMMARY OF THE INVENTION

An advertising engine, system and method of using is described. The engine includes at least one vault including a plurality of media assets, a recommendation engine that matches at least one media asset from the vault with at least one requested creative, a delivery engine that integrates the requested creative with the matched media assets from the vault, and a management engine that regulates and/or tracks ones of the at least one media asset. The method includes the steps of requesting at least one creative based on at least one information item, matching at least one stored media asset to the at least one creative, integrating the at least one stored media asset to the at least one creative, and regulating the at least one media asset matched to the at least one creative.

BRIEF DESCRIPTION OF THE FIGURES

Understanding of the present invention will be facilitated by consideration of the following detailed description of the embodiments of the present invention taken in conjunction with the accompanying drawings, in which like numerals refer to like parts and in which:

Figure 4:
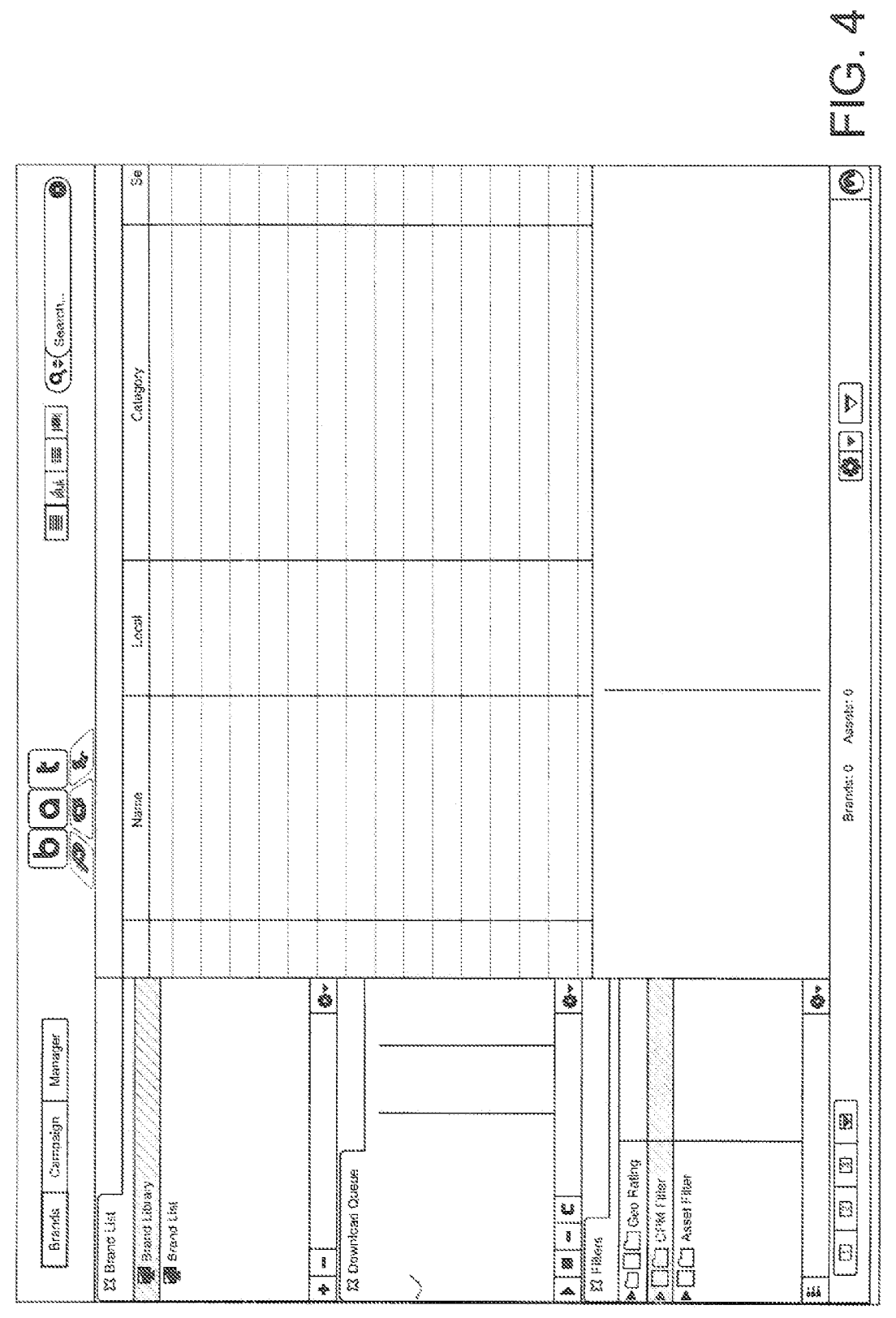

FIG. 4 is an exemplary embodiment of a brand selection and development display of the present invention; and FIG. 5 is an exemplary embodiment of a brand selection and development display of the present invention;

Figure 7:
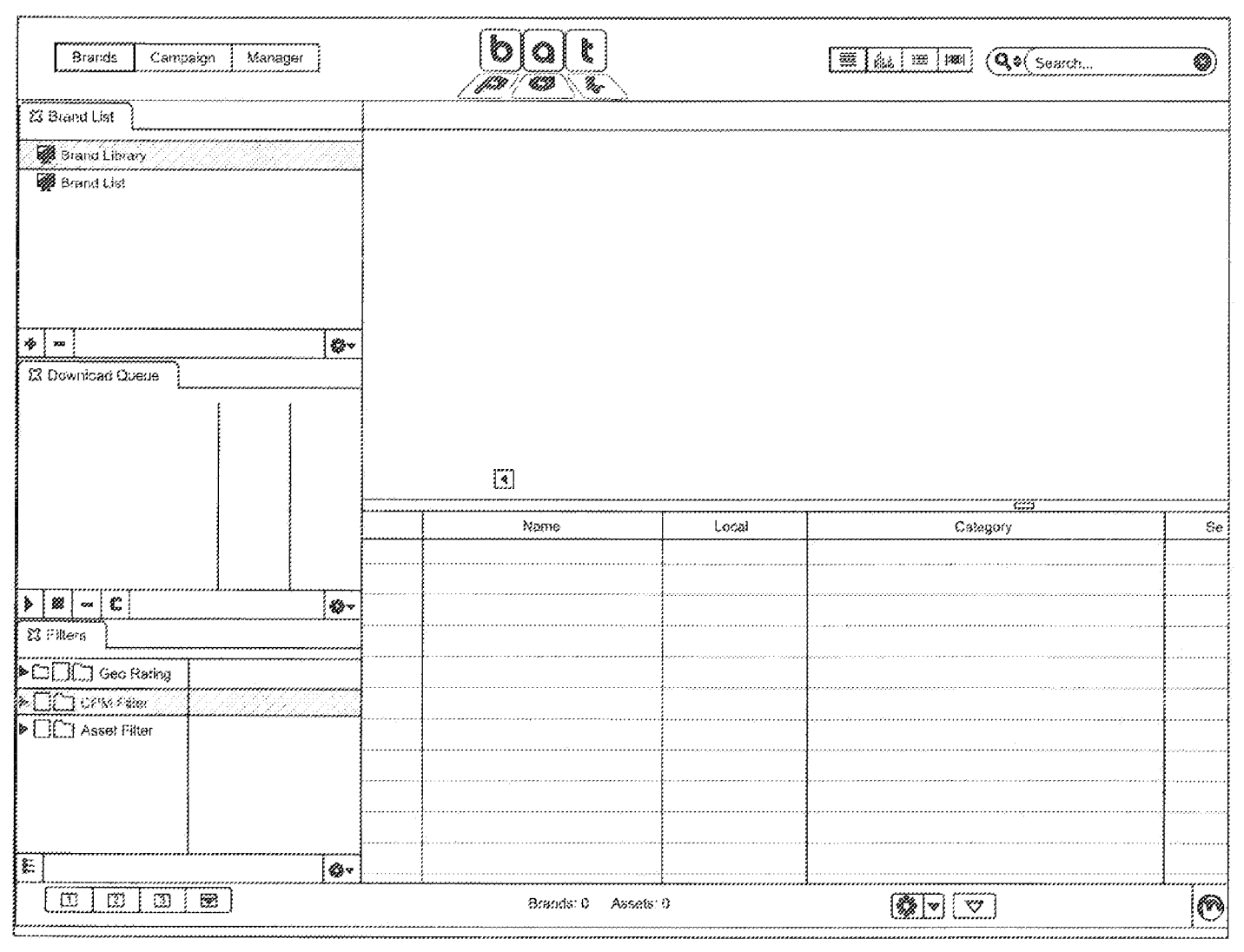

FIG. 7 is an exemplary embodiment of a brand selection and development display of the present invention;

Figure 9:
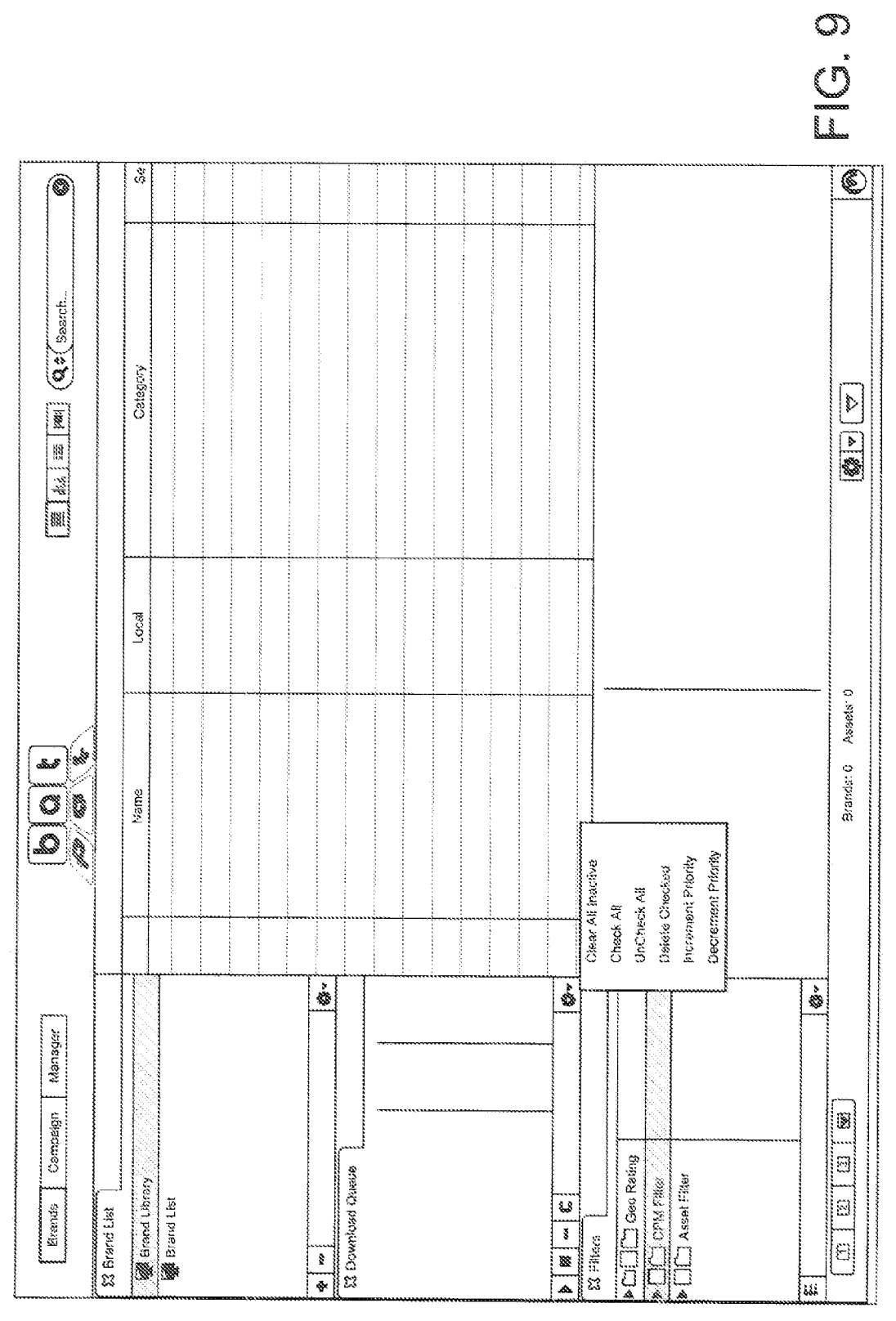

FIG. 9 is an exemplary embodiment of a brand selection and development display of the present invention;

Figure 10:
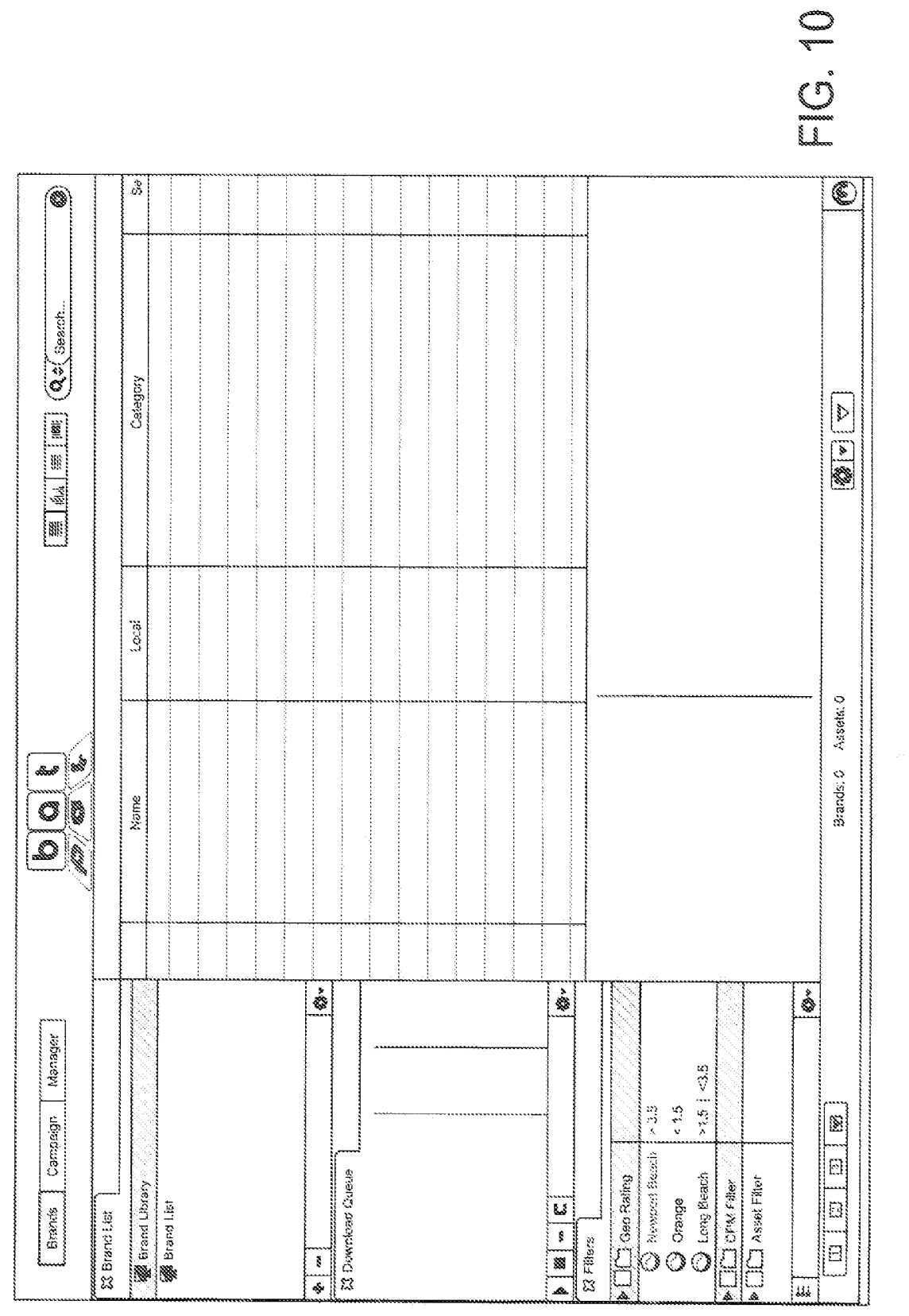

FIG. 10 is an exemplary embodiment of a brand selection and development display of the present invention; and FIG. 11 is an exemplary embodiment of a brand selection and development display of the present invention;

Figure 12:
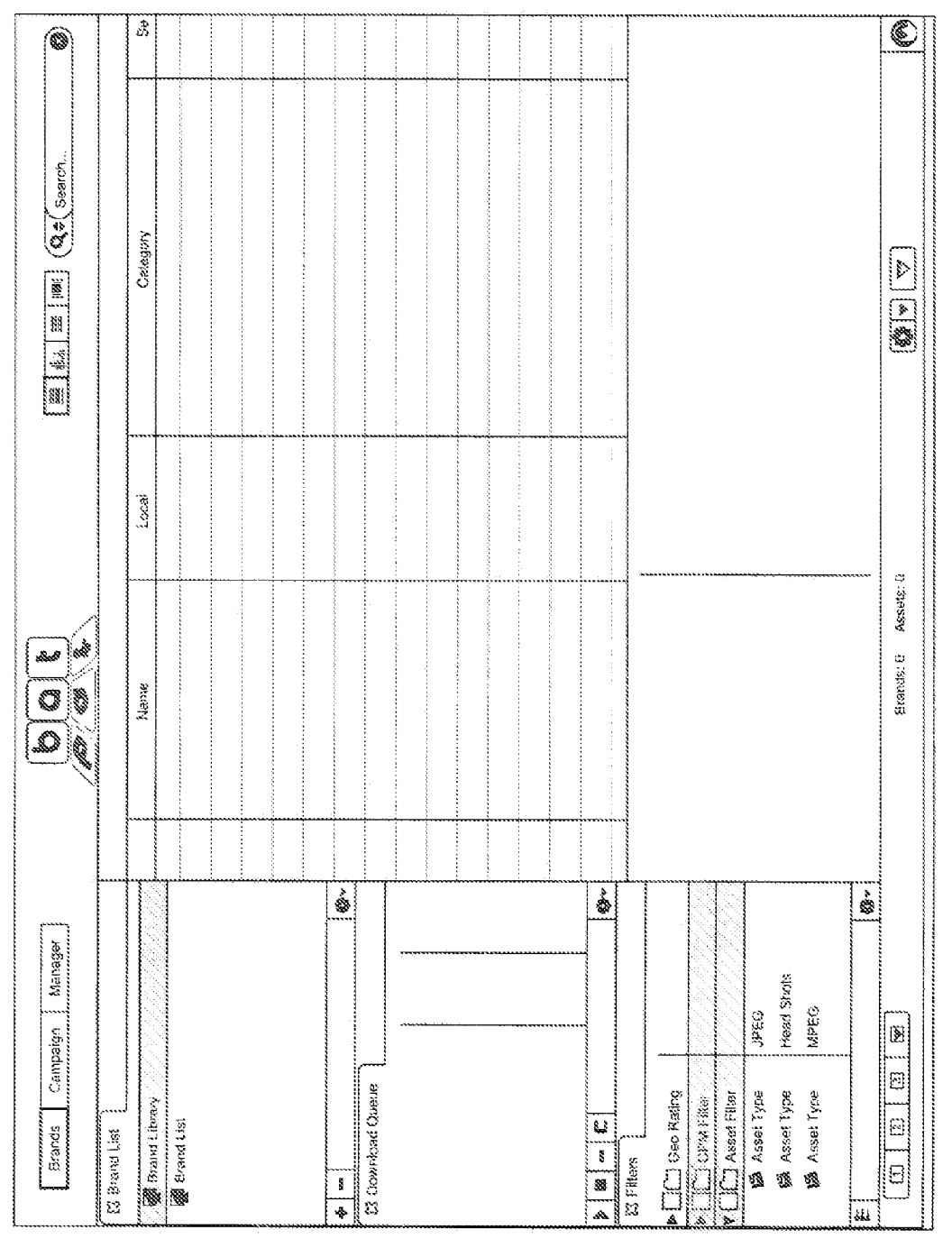

FIG. 12 is an exemplary embodiment of a brand selection and development display of the present invention;

Figure 14:
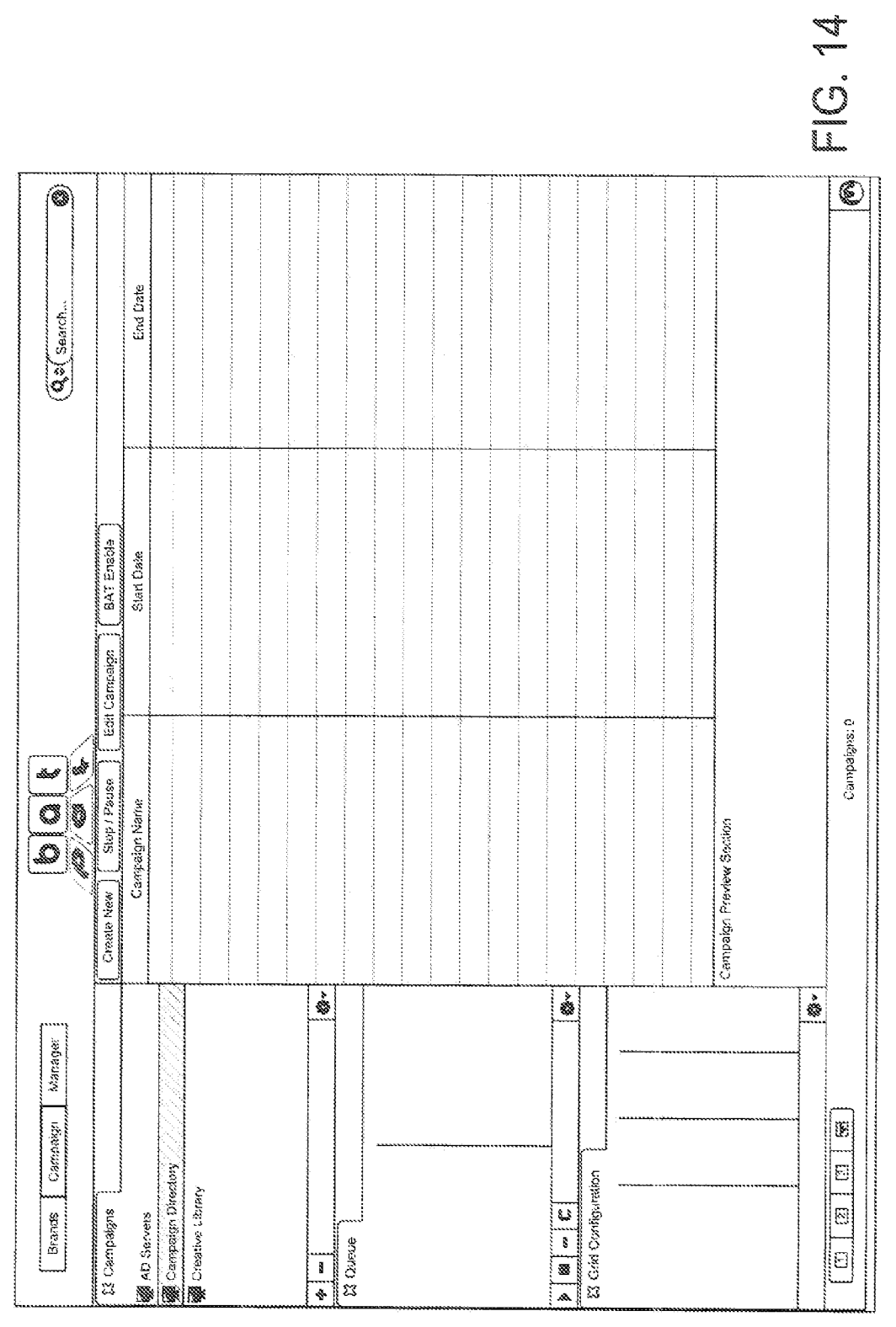

FIG. 14 is an exemplary embodiment of a campaign selection and development display of the present invention.

Figure 18:
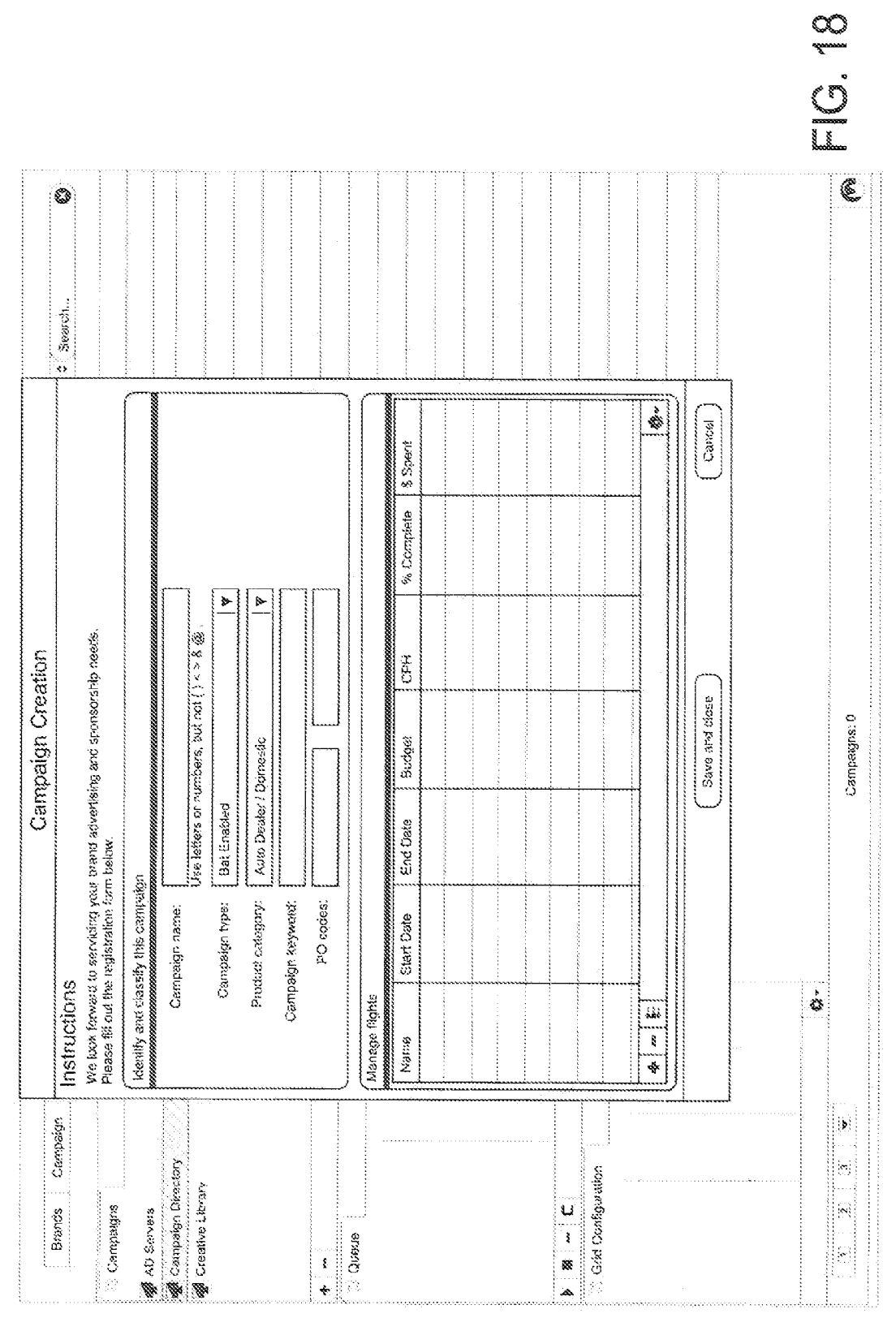

FIG. 18 is an exemplary embodiment of a campaign selection and development display of the present invention; and FIG. 19 is an exemplary embodiment of a campaign selection and development display of the present invention;

Figure 20:
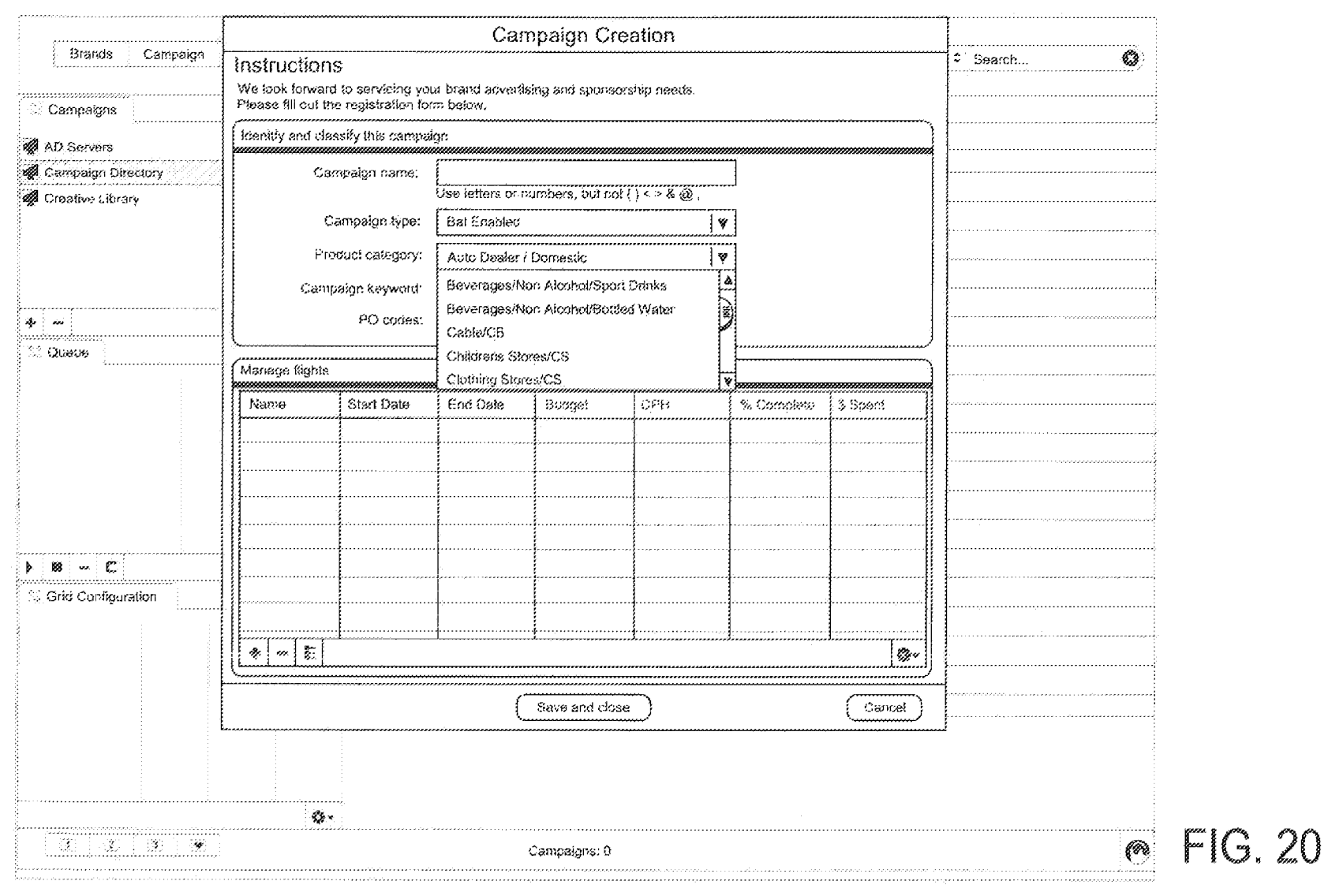

FIG. 20 is an exemplary embodiment of a campaign selection and development display of the present invention;

FIG. 21 is an exemplary embodiment of a manager and administrative control display of the present invention;

DETAILED DESCRIPTION OF THE PREFERRED EMBODIMENTS

Figure 1:
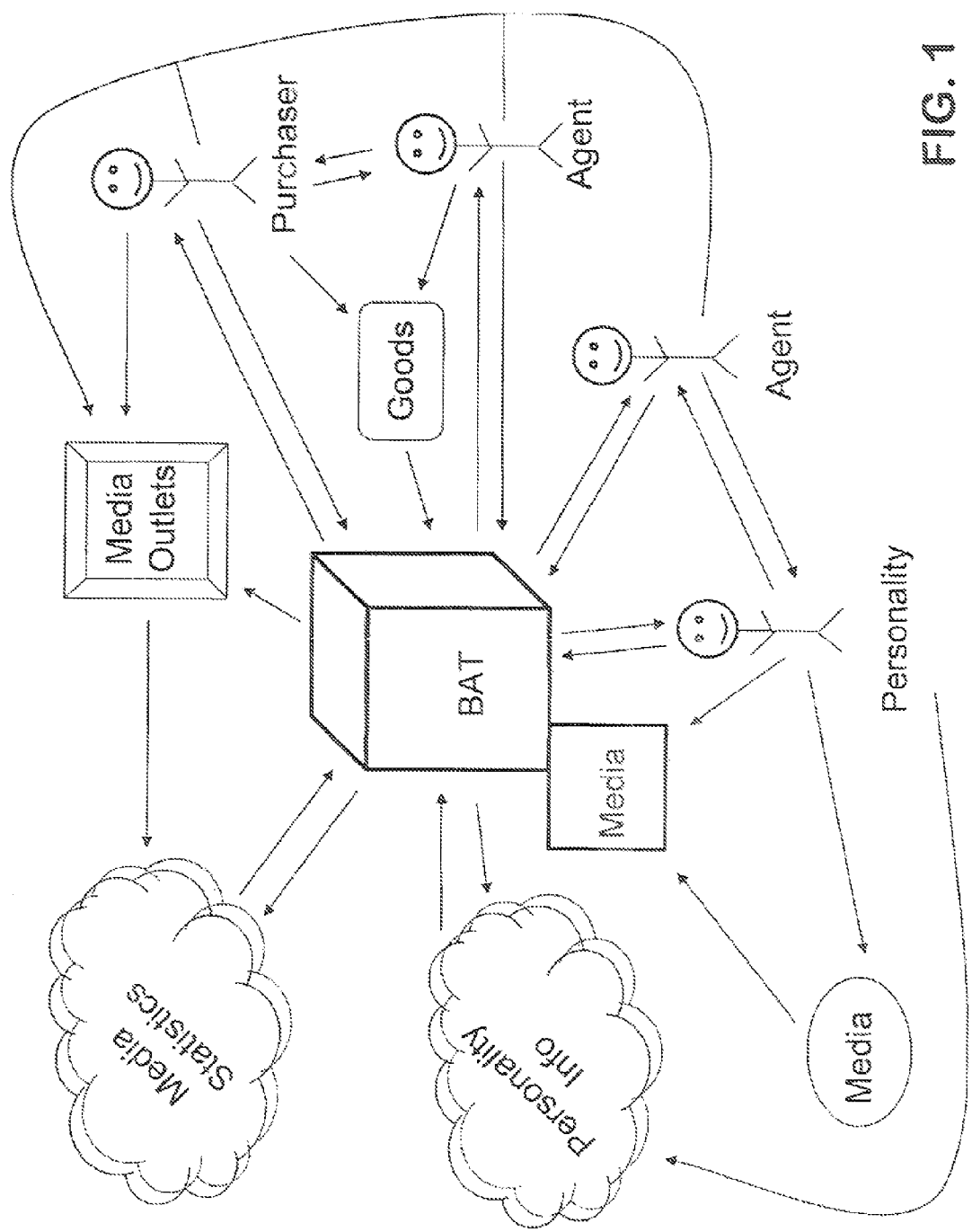
FIG. 1 illustrates an exemplary embodiment of the present invention.

It is to be understood that the figures and descriptions of the present invention have been simplified to illustrate elements that are relevant for a clear understanding of the present invention, while eliminating, for the purpose of clarity, many other elements found in typical advertising engines, systems and methods. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

It is generally accepted that advertising (hereinafter also referred to as "ad" or "creative") having the highest impact on the desired consumer base includes endorsements, sponsorships, or affiliations from those persons, entities, or the like from whom the targeted consumers seek guidance, such as based on the endorser's knowledge of particular goods or in a particular industry, the fame of the endorser, the respect typically accorded a particular endorser or sponsor, and other similar factors. Additionally, the easiest manner in which to sell advertising time or blocks of advertising time is to relay to a particular advertiser that the advertising time purchased by that advertiser will be used in connection with an audio, visual work that has an endorsement therein for that particular advertiser's brand of goods or services. As used herein, such an endorsement may include an assertion of use of a particular good or service by an actor, actress, or subject in the audio visual work, reference to a need for particular types of goods or services in the audio visual work, or an actual endorsement of the use of a product within the audio visual work.

Endorsements may be limited in certain ways, as will be apparent to those skilled in the art. Such limitations may include geographic limitations on the use of particular products (endorsers are more likely to endorse locally in various locales rather than nationally endorse, in part because national endorsements bring a single endorsement fee and generally preclude the repetitious collection of many smaller fees for many local endorsements), or limitations on the use of endorsements in particular industries, wherein a different product or a different industry may be endorsed (such as in a different geographical area) by the same endorser, or limitations on endorsements solely to a particular field(s) or type(s) of product, rather than to a specific brand of product. Further, endorsements by particular endorsers may be limited to products, brands or products or services, types of products or services, or the like which have been approved by one or more entities external from, but affiliated with, the specific endorser. For example, the National Football League may allow for its players only to endorse certain products, brands of products, types of products, or the like, that are also endorsed by the NFL.

More specifically, as used herein endorsements may include: endorsements or sponsorships, in which an individual or a brand may be used to market another product or service to improve the marketability of that other product or service; marketing partnerships, in which short term relationships between different products or services are employed to improve the marketing of each respective product or service; and brand affinity, which is built around a long term relationship between different products or services such that, over time, consumers come to accept an affinity of one brand based on its typical placement with another brand in another industry.

At present, there is a need for a platform or engine to allow for the obtaining of an endorsement, or endorsed ad, in any of the aforementioned circumstances, either from a specific individual, a specific entity, an affinity brand, a marketing partner, or a sponsor. As may be seen in FIG. 1, the development of a targeted advertisement involves a dynamic interrelationship between all relevant factors, such as, for example, the goods, the purchasers, the endorsing personalities and their agents, and the existing or upcoming media associated with each. The ideal advertisement engine must be able to harness and manage all aspects of each of these factors, based upon only a limited number of parameters from which to initiate and generate the advertisement.

Figure 2:
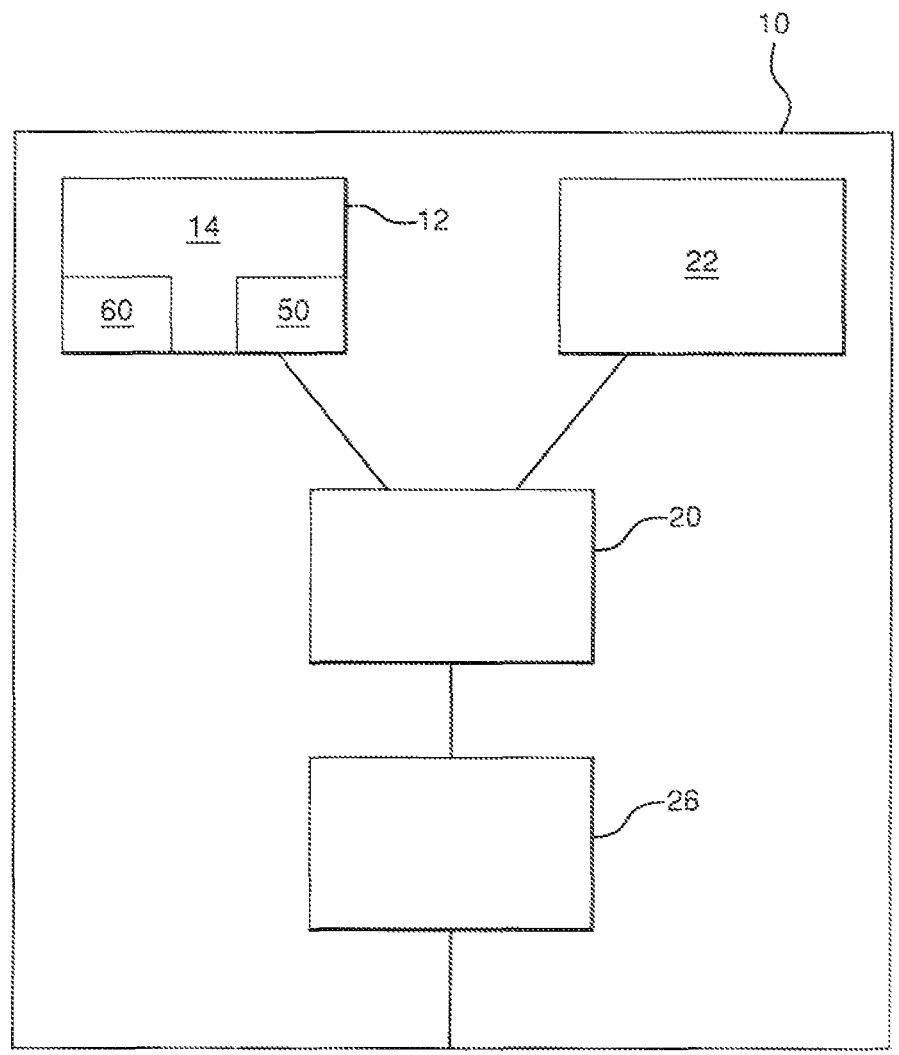
FIG. 2 illustrates another exemplary embodiment of the present invention.

According to an aspect of the present invention, a computer-based endorsed advertising engine 10, such as that illustrated in FIG. 2, may include a data storage device as a vault 12 that stores media assets 14 in which prospective endorsers are identifiable, for integration of select media assets into advertisements without directly involving the prospective endorsers for permission, a brand association or recommendation engine 20 that may, by creative, by market, by brand affinity, by user request, or otherwise recommend a sponsor identifiable in a media asset from the vault for use in a requested ad, and a delivery engine 26 capable of integrating a template 22 for the requested ad with a select media asset from the vault 12, and combining the template 22 and the media asset from the vault into an ad to be presented to target consumers, and delivery of the requested ad to an advertiser or advertising server, which then places the ad on web pages for viewing by target consumers. Ad templates 22 may be accessed and media assets selected from the vault via an "ad wizard".

The vault captures certain brands and information related thereto in a common database, such as all major league baseball past and present players, including statistics, video, and pictures of those players affiliated with the names of those players, in addition to any endorsement limitations on those players. The vault may include media assets that may be associated with audio-visual works, including all metadata associated with any media form. The vault may include symbols, emblems, taglines, pictures, video, press releases, publications, web links, web links to external content, and media capable of re-purposing (such as an athlete running in front of a blue screen, wherein the athlete may be re-purposed by the placement of a background over the blue screen), including pictures, voice, and video.

Media assets may further include such items that are predictive of certain future events for purposes of integrating and scheduling certain media assets for maximum value. For example, media assets pertaining to a particular Major League Baseball starting pitcher can identify those locations, days and game start times for that pitcher. Based on this identified schedule, the ad can be requested in advance, and subsequently constructed, delivered and aired on a recurring basis. In another example, media assets may identify a particular golfer who is leading a PGA event prior to the final round. Likewise, the present invention may provide percentage chances of future events to occur based on collected media assets or other collected data, and provide ad requestors the opportunity to identify and utilize endorsers who may have significantly increased value within a relative future timeframe.

The vault may also include, associated with the brand, exclusion, inclusions, or preferences 50 for the use of the brand or particular items of information associated with the brand in the vault. Such inclusions, exclusions, or preferences may include geographic limitations on certain information items or endorsements, product limitations, preferred partners or products or product types for endorsement, etc. Exclusions may, of course, be necessary if the requested endorsement conflicts with a pre-existing endorsement agreement for the requested brand with a competitor, or the like.

According to an aspect of the present invention, media assets associated with particular people, entities or estates may be contractually obligated for endorsement of individual media assets or sets of media assets prior to storage of such assets in the vault. Such contractual obligation may provide for a more streamlined process of media asset recommendation. In another example, such contractual obligation or pre-existing obligation may become part of the media asset descriptor or tag, such that an ad requester may select or search for only those media assets that do not require further contracting for use in the requested ad. In such an embodiment, the present invention may include a separate management engine or functionality (see further description below) to monitor, review or confirm the presence or absence of contractual matters associated with internal and/or external media assets.

Further, media assets in the vault may be marked with different payment schema 52 based on the requester of the media asset. For example, in the event the ad requester is a school, and the requested creative is not an ad to sell anything, media assets may be available for use for free. Such exceptions may be made, with regard to payment, with regard to any level of payment variation as between any number of different user types, such as non-profit, for-profit, individual, corporate, in-home, in-business, and the like. Additionally, for example, icons of a favorite football player may be requested by a non-profit individual for at-home use, to be overlayed over a live football program then on that individual's television, at no charge to that individual.

The brand association and recommendation engine 20 assesses, based on numerous factors including external factors, the endorsements that are most sensible for particular advertising. For example, such a brand association engine gauges proper matches by assessing inclusions and exclusions based on the aforementioned factors in the vault, such as geography, but additionally it may use stored or external information and/or variable factoring to do brand associations for any two brands (such as wherein brand associations already exhibiting brand affinity would have the highest percentage association, and brands which would make the most sensible association would also exhibit higher percentage matching for brand association), or to do matching with an endorsement brand based on the target consumers of the requesting brand.

For example, a "profile" 60 may be developed in the vault for a particular brand. Such a profile may include any of a myriad of information, both stored in the vault and having external references outside the vault from within the vault, including but not limited to psychological profiles of typical users of that brand (which may include values, motivations, wants, and needs of such users, and which may be assessed based on inferences from activity data, such as on-line, credit card, or television use by those users, for example), brand profiles including target customers, target affiliate profiles (which may include reasons for desired affiliation, such as sharing marketing costs, increasing brand recognition in certain geographies or fields of use, distribution channel access, expedited market entry, or improved brand perception, for example), and the like, and such profiles may be used as media assets by the recognition engine in order to develop a best match. As an additional example, polling results and/or metadata may provide for local or national focus and maintained in the vault as an associated media asset with a particular brand, and best matches for certain brands may be selected according to such polling results or associated metadata. For example, a "flashy" sports personality may be a best match for a brand offering in Los Angeles, but a different athlete's endorsement might be preferably to sell that brand in the mid-west. Such information, including "who's hot", or where a brand is "hot", may be associated with the media assets regarding that brand in the vault, and may be thus used by the recommendation engine to do matching.

According to another aspect of the present invention, the media assets may be categorized and ranked or tagged for identification by the recommendation engine. For example, the input for the requested ad 22 may be compared with media assets 14, and a weighting or similarity calculation is computed between the requested ad 22 and the media assets 14. Such calculations and comparisons may be made with individual media assets, or with any sort of media asset sets or subsets. Prior to delivery to the ad requestor, the media assets 14 with the highest weight values or other similarity comparator relative to the requested ad 22 may be merged into a single deliverable, such as in a list form, where each media asset 14 or media asset set may identify the weight value associated with it. In this exemplary embodiment, weight values may reflect the degree of similarity to the requested ad 22.

The searching function of the recommendation engine for identifying media assets for weighting and ranking may include those tagging and searching tools as understood by those having skill in the art. For example, the media assets may include all forms of metadata, tags, unique descriptors (pointers or identifiers), or even digital representations of the media assets themselves.

In another aspect of the present invention, requested ads 22 may themselves become media assets, and as a further example, such requested ads that become media assets may provide the recommendation engine additional knowledge for future recommendations. This may in effect allow the recommendation engine to "learn" the ad request patterns for providing repeat requestors or similar ad requestor more desirable recommended media assets. In other words, the human aspects of the profiles themselves become media assets and thus provide a feedback loop for increasing the amount of desirous recommended media assets beyond that which can be identified via tags or descriptors.

Similarity calculations may be further constructed to match at different levels of abstraction. In such embodiments, mapping functions may be used to associate particular items in the requested ad 22 to a more general description of a media asset 14 or media asset set. The level of abstraction may be a function of the search parameters, or may be a functionality of the price paid or the complexity of the media asset search requested.

Thus, the recommendation engine may passively or actively inform or otherwise identify the best endorsement matches for a particular user's ads, based on any number of factors, and limited only by the amount and type of information identified in the requested ad. Upon assessment of good matches for the requesting ad or even brand, a user of the present invention may have the matching options presented to that user for selection by the recommendation engine, or the user may simply have a best-match selection made for the user. Needless to say, bids for advertising may vary based on the matches obtained by the recommendation engine, and/or the asserted likelihood of success that the ad placed will be successful. Success, of course, may be different in different circumstances, and may include a consumer making an on-line or in-store purchase, a user filling out an on-line or off-line form, a consumer accessing and downloading information or a coupon, or the like.

According to yet another aspect of the present invention, the engine 10 may be used for identifying and recommending a brand itself instead of an ad. For example, the recommendation engine may match media assets from the vault with product identifiers and descriptors entered by a requestor, such that the recommendation engine may identify and match those media assets for branding the product. Results from the recommended branding may then be re-entered to the advertising engine 10 via a requested ad 22 as described above to produce an endorsed ad for deliver to an advertiser or advertising server.

The delivery engine 26 may integrate a requested template 22 with a media asset from the vault pursuant to the actions by the recommendation engine, and can place a particular ad in the environment it deems best suited for that ad (such as in the event of a re-direct, wherein a web site gives some information about an ad placement, and the best ad can be placed responsive to the information), bind a select template and a media asset for delivery to target consumers (such as in the event that later stage tracking can further improve ad targeting, such as if the viewer's IP address and/or information of the viewed site is available just prior to ad delivery), or deliver the template and a select media asset from the vault to an advertiser or advertising server, which then independently combines the ad template and media asset into an ad, and places the ad. Bids for advertising time may vary depending upon the delivery mechanism used.

Because the bids for advertising time in the present invention may vary as discussed above, the present invention lends itself to auction-style placement of advertising, in which bids are solicited for particular locations, times, or blocks of advertising. Auctions may be held, for example, on line, and may be broken down by media outlet type of ad (i.e. television, internet, etc.), product type of ad, or in any similar manner.

According to another aspect of the present invention, a management engine may be used for performing various managerial functions, such as tracking, reporting, quality control, legal or other regulating mechanisms associated with advertisement engine 10. The management engine may be used within advertisement engine 10 at any point in the recommendation and delivery process, as well as in follow up on delivered or aired ads. The management engine may also act as a regulating body for inclusion or exclusion of media assets prior to storage in the vault.

For example, in one exemplary embodiment, the management engine may be used for tracking media assets during the recommendation and delivery process. The media assets may be tracked by the number of hits they receive for recommendation and or the number of times the media assets are authorized for delivery to the advertiser. The ads themselves may also be tracked by the management engine based on any sort of parameters, using tracking mechanisms as understood by those having skill in the art.

In another exemplary embodiment, reports may be generated, reviewed and delivered to advertisers, endorsers, agents or other third parties, where such reports relate to the various components of the advertisement engine, such as the ads, ad requests, and/or the media assets. Reports may also be based on any tracking records.

The management engine may be used to contact and gain agent approval for particular endorsers, either prior to storage of the associated media assets in the vault, or upon selection of those associated media assets by the recommendation engine in response to the requested ad. The management engine may also verify any parameters associated with contractual obligations attached to the media assets, and may alert the ad requestor, the advertiser, or other party as to the results of such verification.

The management engine may also be used to screen existing media assets in the vault and filter or even remove media assets from the Vault. For example, if a media asset is determined to have a tag or descriptor that is no longer relevant, or is otherwise incorrect, the management engine may remove the tag or descriptor, or even remove the media asset from the vault entirely.

According to an aspect of the present invention, the present invention may incorporate application architecture that may include a software framework and graphical user interface that optimizes ease of use of the software platform, and that may also extend the capabilities of the software platform. The application architecture may approximate the actual way users organize and conduct activities, and thus may organize activities in a natural, coherent manner while delivering activities through a simple, consistent, and intuitive interface within each application and across applications. The architecture may also be reusable, providing plug-in capability to any number of applications without extensive re-programming, and may thereby enable parties outside of the described system to create components that plug into the architecture as well as allowing the instant system to plug into third party architectures.

The architecture of the present invention may provide, for example, applications accessible to one or more users to perform one or more functions. Such applications may be available at the same location as the user, or at a location remote from the user. Each application may provide a graphical user interface (GUI) for ease of interaction by the user with information resident in the system. The GUI may be specific to a user, a set or type of users, or may be the same for all users or a selected subset of users. The uniqueness of the GUI may be indicated by the user, or optionally offered as selections within the GUI by the architecture. The architecture may also provide a master GUI that allows a user to select or interact with GUIs of one or more other applications, or that allows a user to simultaneously access a variety of information otherwise available through any portion of the present invention.

Presentation of data through the architecture may be in any sort and number of selectable formats. For example, a multi-layer format may be used, wherein additional information is available by viewing successively lower layers of presented information. Such layers may be made available by the use of drop down menus, tabbed pseudo-manila folder files, or other layering techniques understood by those skilled in the art. Formats may also include AutoFill functionality, wherein data may be filled responsively to the entry of partial data in a particular field by the user. All formats may be in standard and/or normalized readable formats, such as XML.

The architecture may limit, for example, data manipulation, or information access. The architecture may also implement access or use restrictions for users at any level. Such restrictions may include, for example, the assignment of user names and passwords that allow the use of the present invention, or the selection of one or more data types that the subservient user is allowed to view or manipulate.

Figure 3:
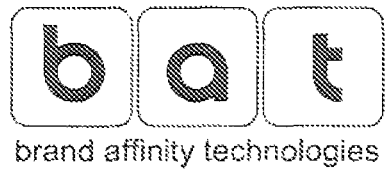
FIG. 3 is an exemplary embodiment of a registration and login display of the present invention.
Figure 6:
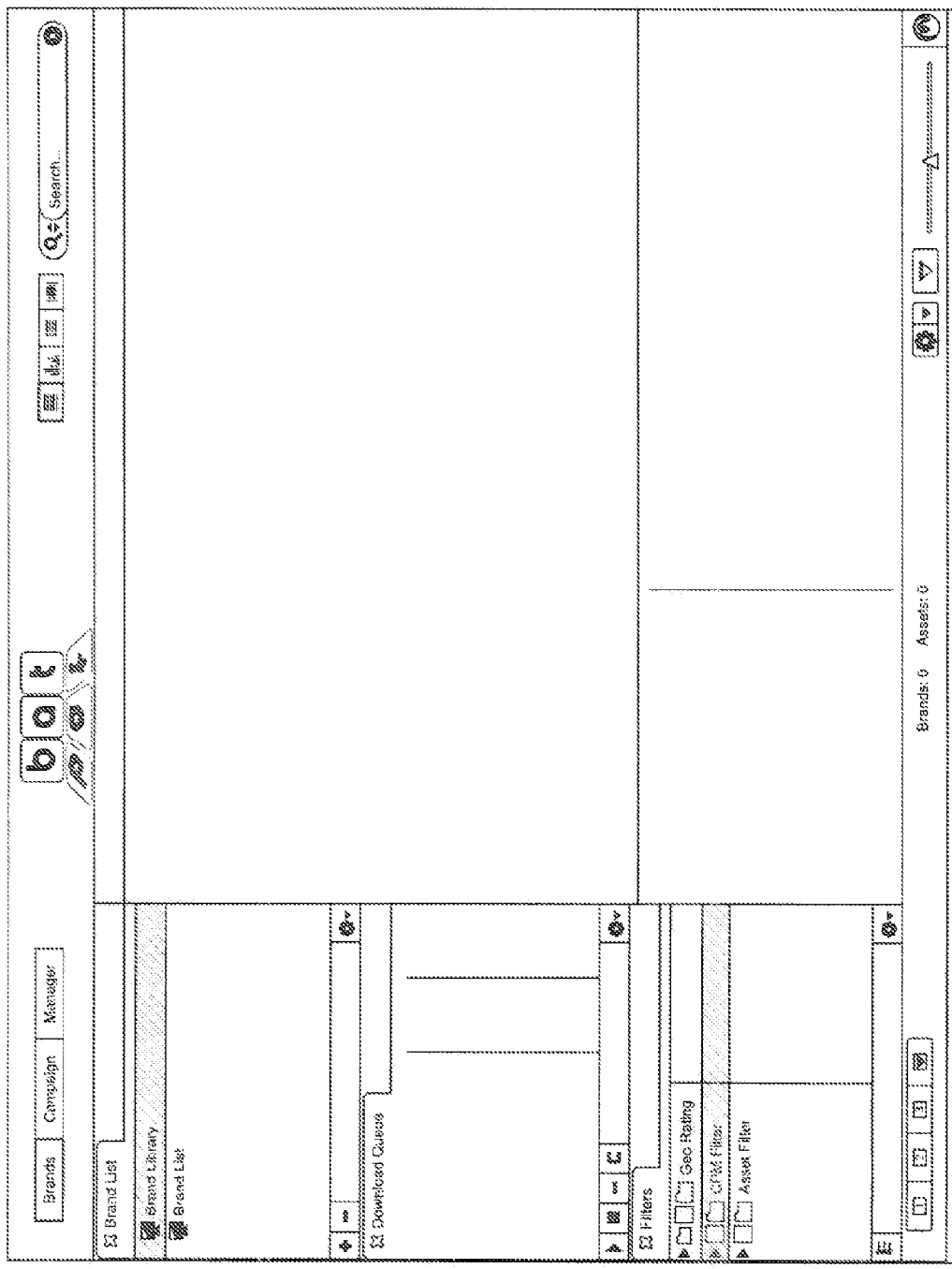
FIG. 6 is an exemplary embodiment of a brand selection and development display of the present invention.
Figure 8:
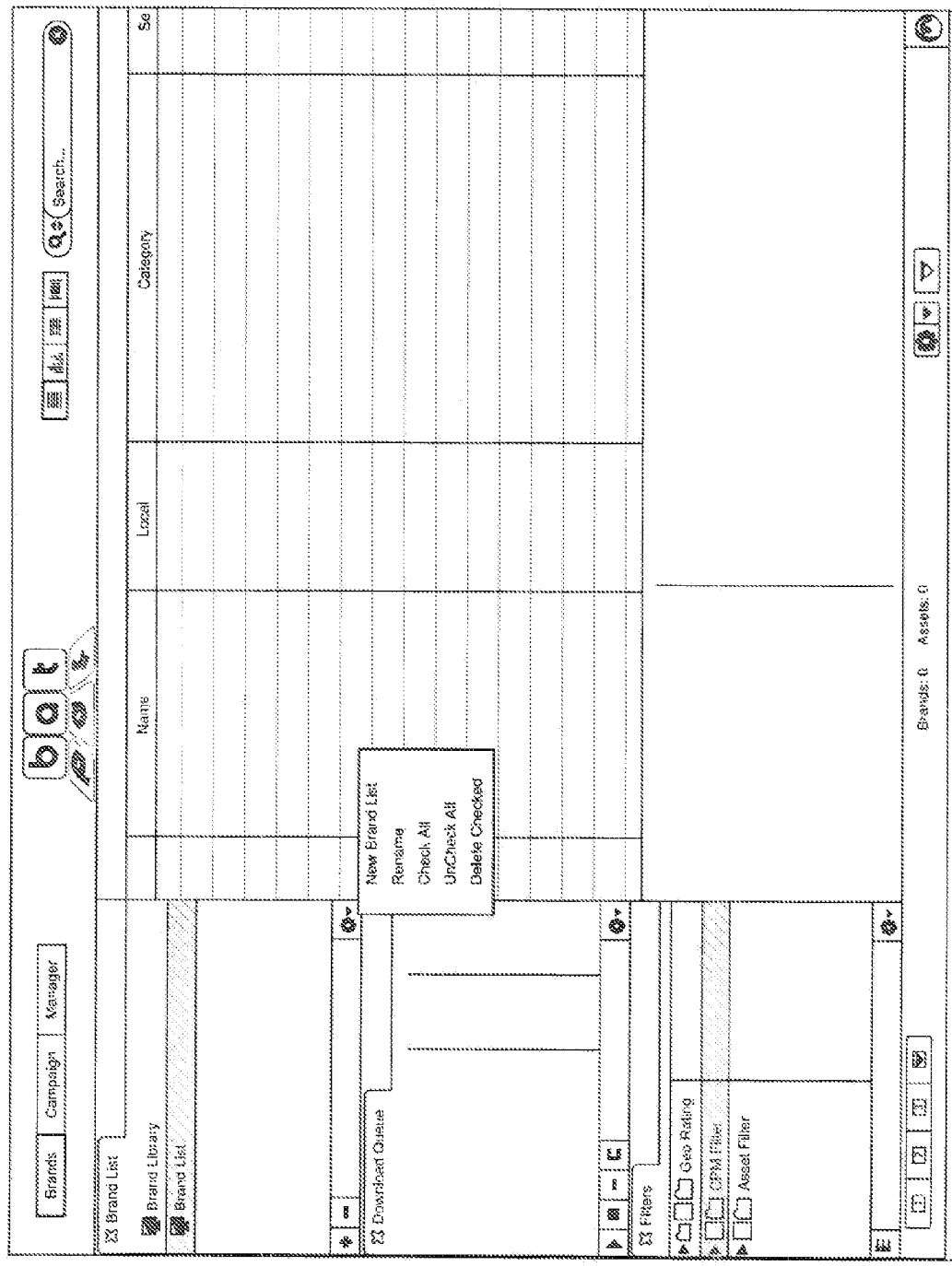
FIG. 8 is an exemplary embodiment of a brand selection and development display of the present invention.
Figure 13:
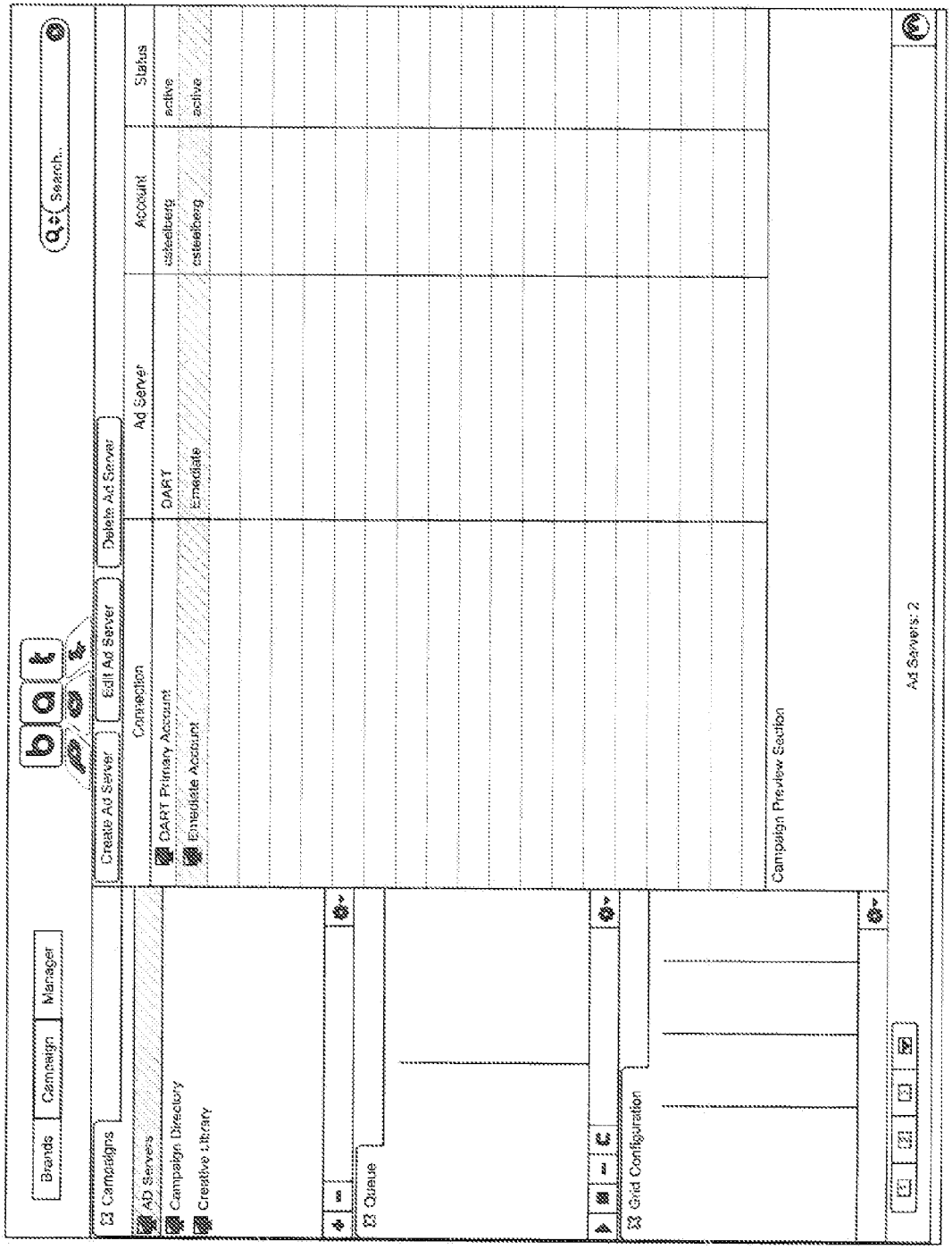
FIG. 13 is an exemplary embodiment of a campaign selection and development display of the present invention.
Figure 15:
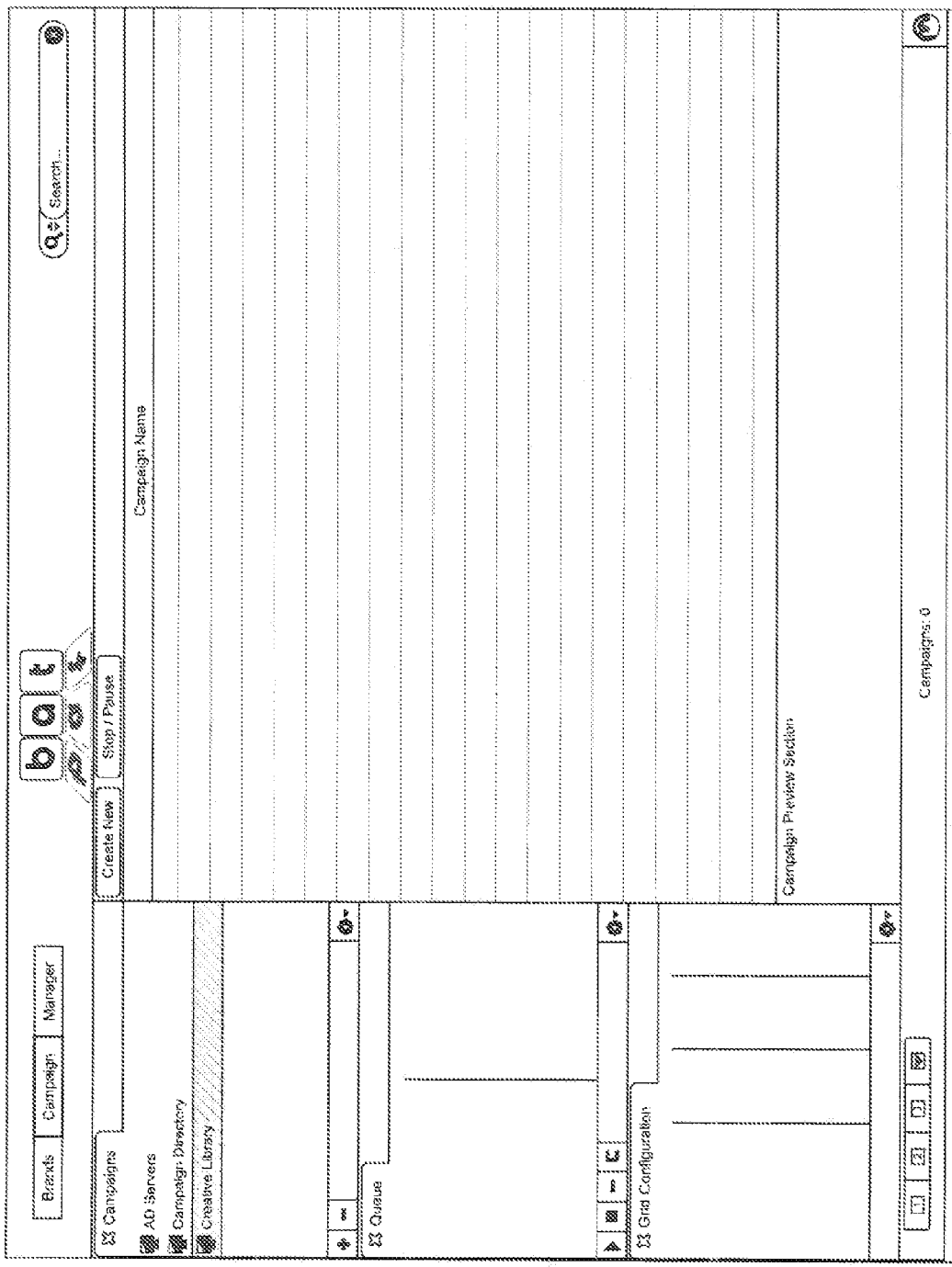
FIG. 15 is an exemplary embodiment of a campaign selection and development display of the present invention.
Figure 16:
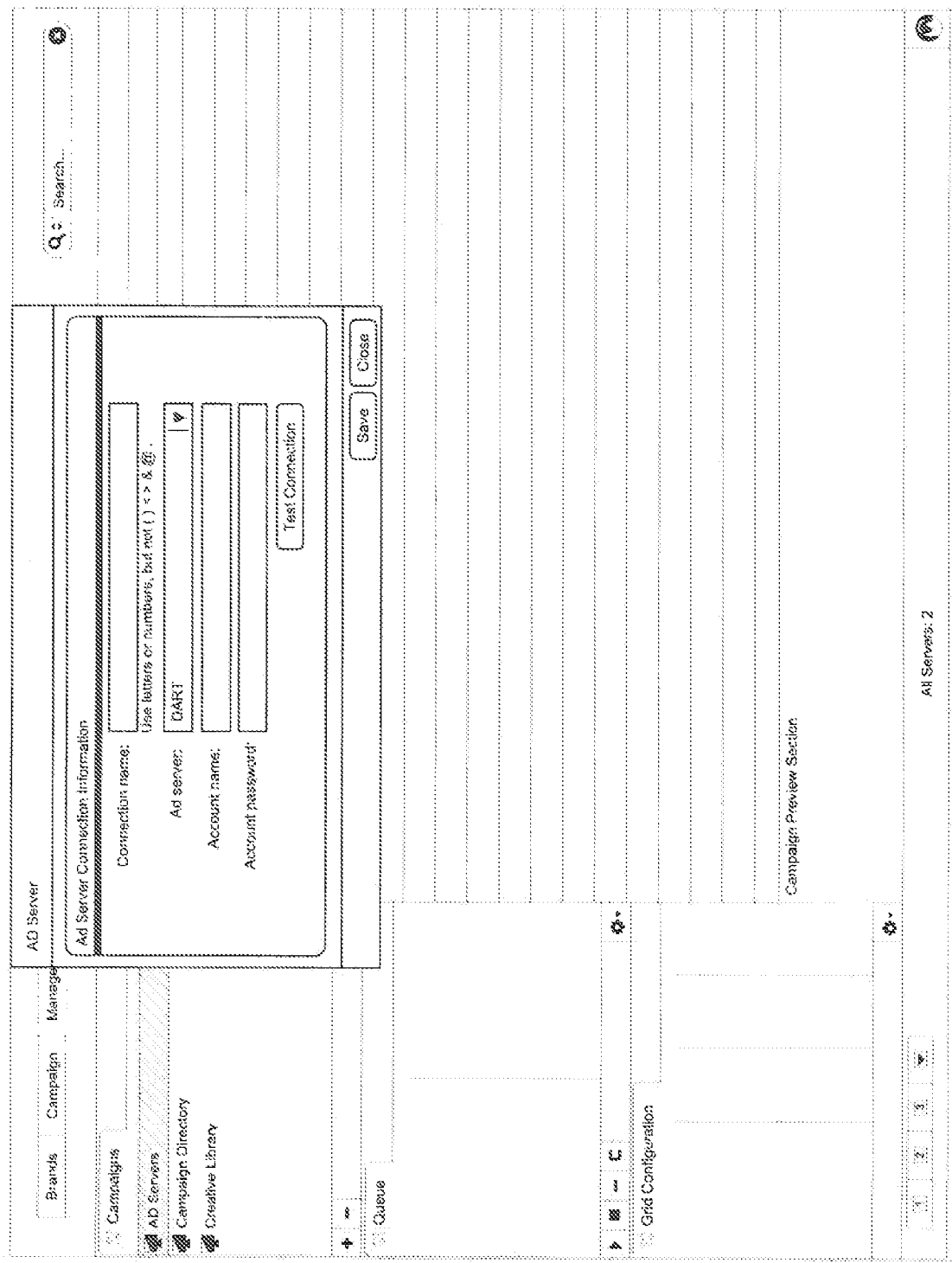
FIG. 16 is an exemplary embodiment of a campaign selection and development display of the present invention.
Figure 17:
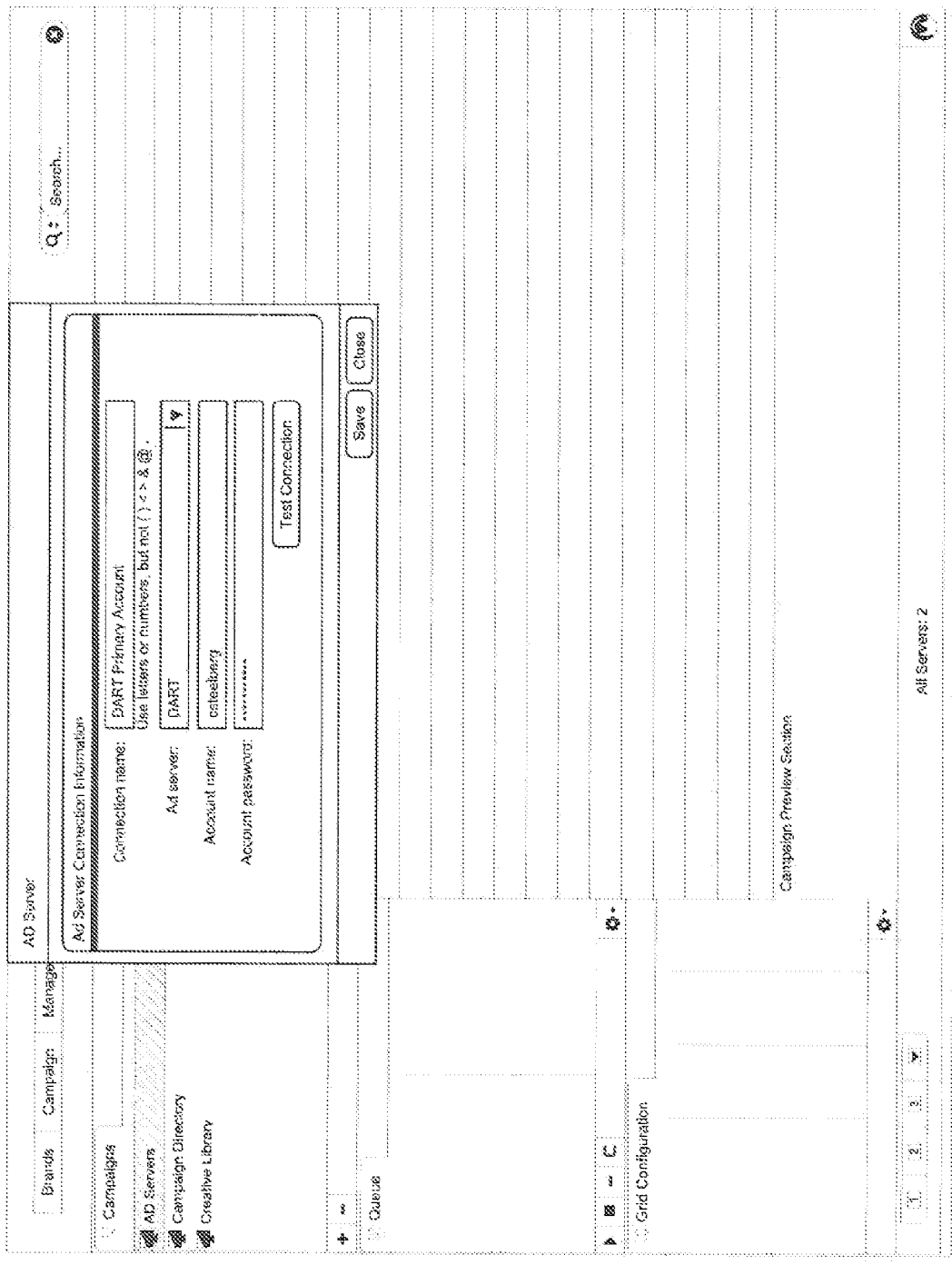
FIG. 17 is an exemplary embodiment of a campaign selection and development display of the present invention.

As shown in FIG. 3, individual user accounts may be established to customize information or to target information or promotional material to particular users or set of users. Individual email accounts may also be established, or previously existing email accounts may be associated with individual user accounts.

In other embodiments, as shown generally in FIGS. 4-21, a multi-layer format having selectable buttons or tabs is used, with selected layers occupying defined space on the graphical interface. For example, as shown in FIGS. 4-12, a user may select and develop a brand or branding schema. Brands, and those media assets associated with the brands, may be viewed in a listing or library format, selected for download, and may further be viewed or associated with a geographic or regional mapping program. Media assets associated with the brands may also be viewed as picture or video files and visualized with any sort of media player application as understood by those having skill in the art. A filtering system may also be used. For example, assets may be filtered by an asset class, such as file type, file size or visual aspect of the asset, such as a head shot. Filters may also be based on cost, such as a cost per minute. Costs may further be filtered on cost ranges, or threshold values to which costs must be above or below. Filters may further be constructed based on geographic ratings. For example, a rating system, such as one based on population and/or distance metrics, can be used to rank and filter brands and media assets based on threshold ranking values or value ranges.

In another example, as shown in FIGS. 13-20, a user may select and develop advertising campaigns. For example, accounts with various ad servers, through which the advertising campaigns may be run, may be created, edited or deleted from a server list. When creating an ad server, account information may be established, such as account names, passwords and connection information to provide identifiers and connectivity with the ad servers. Campaign directories and libraries may also be created. Such directories and libraries identify and categorize those campaigns already created. New campaigns may of course be created. In the creation of a new campaign, information relating to the campaign name, type, product category, and any associated codes and keywords may be entered and established for the new campaign.

Figure 21:
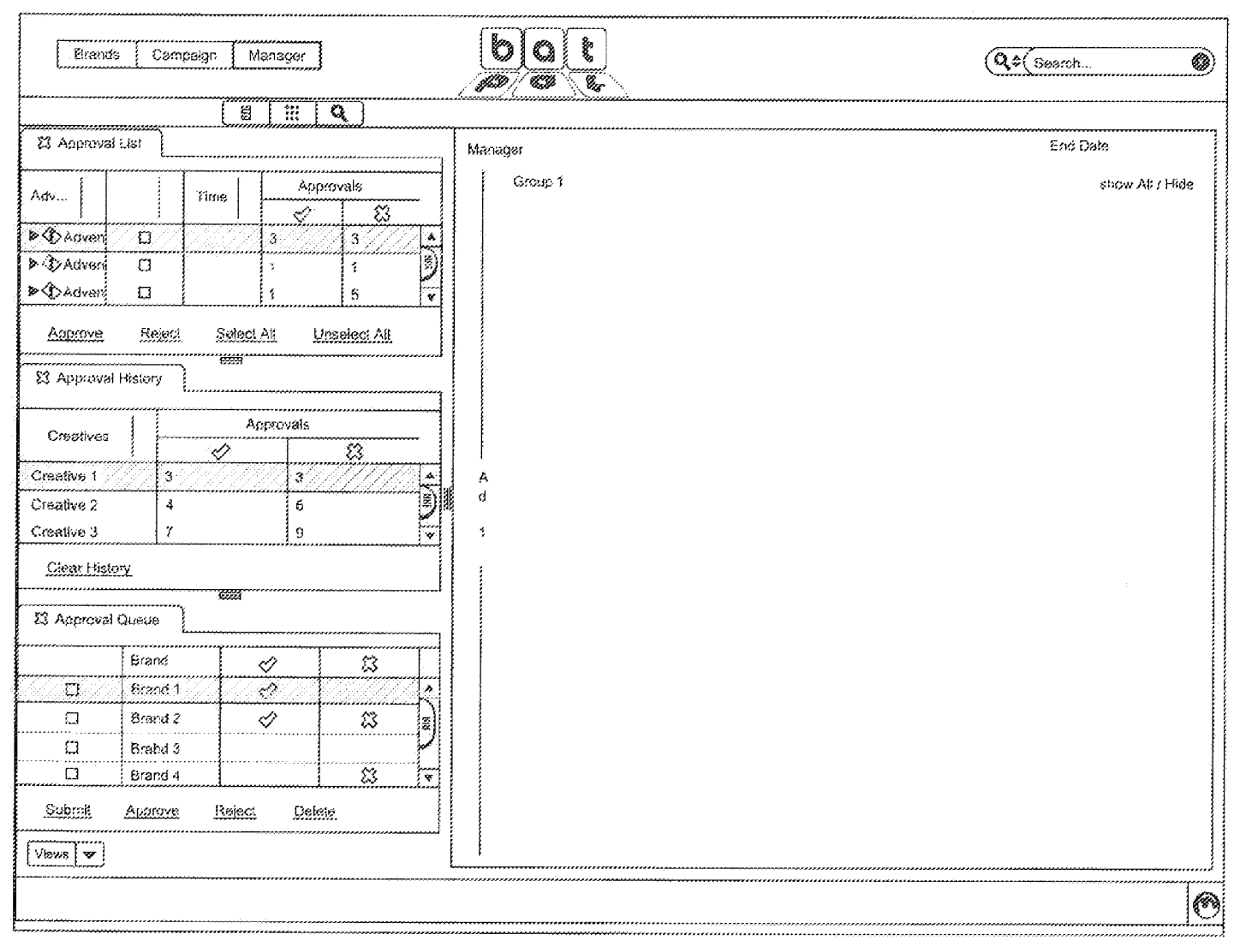

Manager functionality, as shown in FIG. 21, may provide a manager the ability to perform managerial and administrative tasks associated with selected and/or developed campaigns, brands, creatives and media assets. For example, managerial access may be provided to the user, and selected items may be presented in an approval list. The approval list may be organized such that the user may efficiently identify what has been approved or rejected, and at what time such approval or rejection was made. Further data sorting may provide for identification of those items still requiring approval. Data relating to the approval process may be compiled to provide statistical data and required and understood by those having skill in the art. In another example, an approval history may associated with a creatives list, or other items such as brands, assets or campaigns. An approval queue may also be implemented for storing and sorting those items for future approval.

Figure 22:
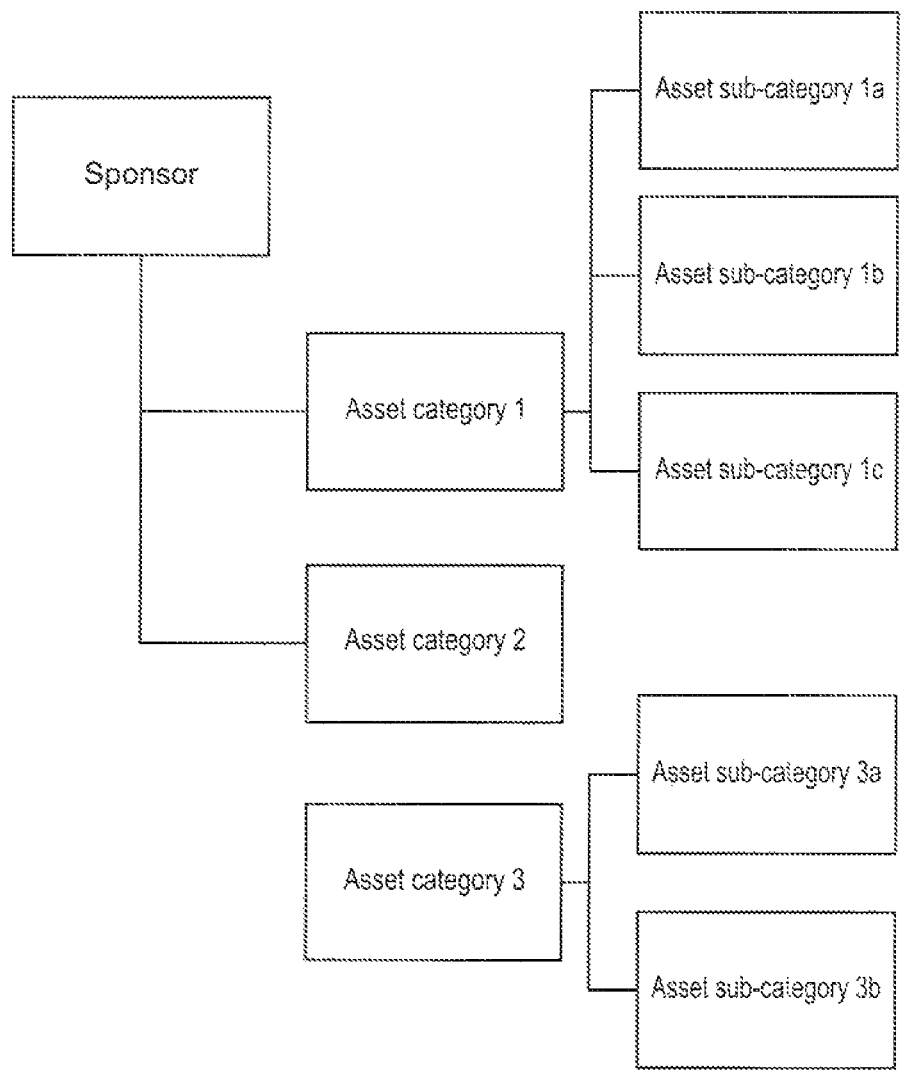
FIG. 22 is an exemplary embodiment of a sponsor and associated asset tree menu.

According to another aspect of the present invention, various sponsors, meaning specific individuals, entities, affinity brands, or marketing partners, for example, may be presented to a user via the system or interface in manner that provides for ease of viewing and selection of assets associated with a particular sponsor. For example, as shown in FIG. 22, a tree menu may be used to organize those assets associated with the particular sponsor. Starting with the sponsor, any number of general asset categories can be established. These categories can be based on any sort or type of factors, such as geography, timeframe, activity, product, or any other factor relevant to the assets. Likewise, these general asset categories may each have any number of sub-categories, thereby creating a multi-level or multi-tier tree, where each level or tier provides a more narrowed set of assets to select from. In another exemplary embodiment, hierarchical pull-down menus may be used to establish categorical levels of assets associated with a particular sponsor. These pull-down menus may ultimately provide the same functionality as the tree menu, albeit in a different programmable and visual format. In yet another embodiment, sponsors may be presented as a virtual rolodex or series of selectable cards. In this embodiment, a user may scroll through the available sponsors via a scroll bar, or by dragging portions of the sponsor card, such that the user may "flip" or "turn" each card or particular cards successively. Upon identifying the desired sponsor, the user may select the sponsor and be provided a list of assets associate with that sponsor. The organization of those assets may be any of the methods described herein, as well as those other methods as understood by those having skill in the art.

Figure 23:
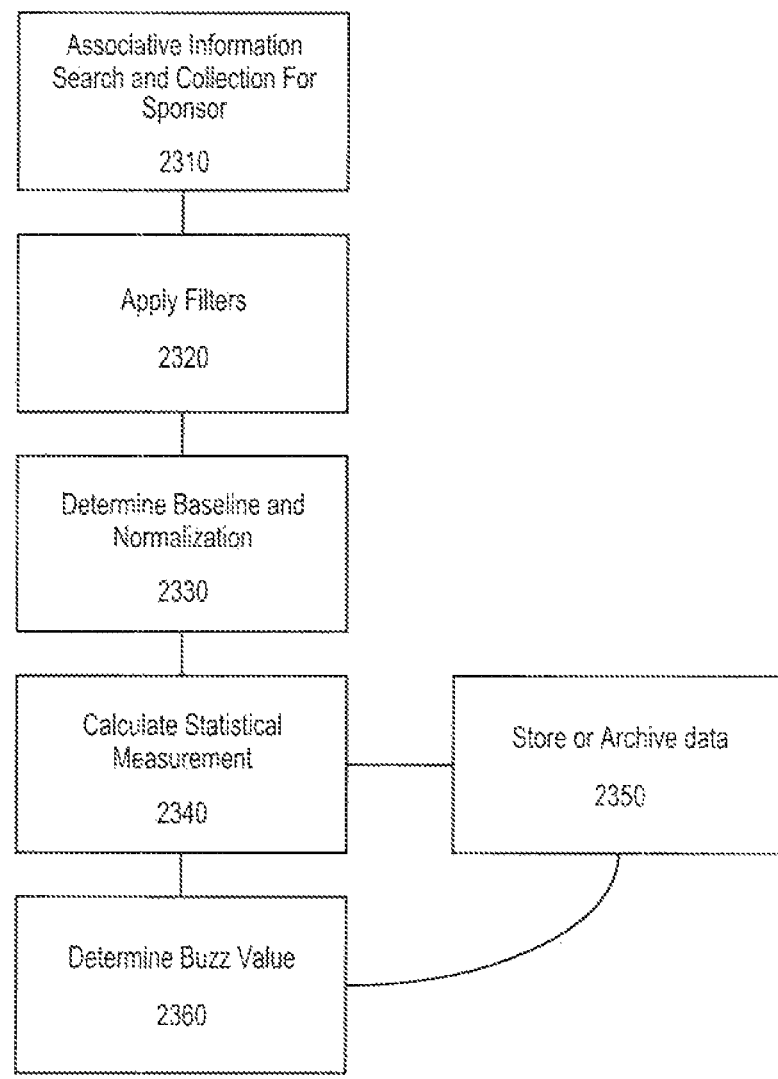
FIG. 23 is a flow chart of a method of generating and determining a buzz value.

According to another aspect of the present invention, a vast variety of associative information may be attributable with and complement any particular sponsor, such that when a user selects a sponsor to generate a creative, ad or campaign, the associative information attributable to that sponsor will be available to aid the user in the selection and distribution of the various assets also associated with that sponsor. For example, current, real-time news or events involving a sponsor would be made available to a user upon selection of the sponsor. As shown in the FIG. 23, a method of generating buzz values attributable to a given sponsor is provided. In step 2310, associative information for a sponsor is searched for and collected. In step 2320, any number of filters may be applied, such as geographic parameters, time-sensitive metrics, and product based, for example. In step 2330, a baseline value and normalization techniques are applied. In step 2340, statistical mechanisms are determined and applied to the collected data. In step 2350, the collected data may be stored. In step 2360, the final buzz value is determined.

Associative information can be collected for all sponsors continuously, and stored for a predetermined time, such as a week, month or year. Alternatively, associative information can be searched for and presented to the user upon selection of the sponsor. Presentation of any associative information may be made by drill down techniques, pop-up windows, menu selections, or any other mechanism as described herein or otherwise understood by those having skill in the art.

Associative information may be categorized and organized in a similar manner as for any assets described herein. Associative information may further be processed into statistical data, such that graphs, charts, comparators and rating scales and/or systems may be generated to provide a user with data determinative of the real-time popularity or value fluctuations over time, geography, or any other parameter, for a given sponsor. The culmination of the monitoring, collection and analysis of associative information may effectively create a "buzz" value, that positively or negatively temporarily effects the value of certain assets associated with a particular sponsor.

In a process of evaluating associative information, values can be attributed and normalized to reduce the effects unrelated to the buzz around a sponsor. For example, while values are likely to grow from midnight to midday in a given geographical area surrounding the locale of a sponsor, and where media users are awake and add to the associative information, the value measurements can be normalized to remove time of day variations. Other variations, such as seasonal variations, weekly variations and general topic variations (when examining buzz for more specific topics), can also be normalized out. Ratios and difference measurements might also be performed in comparing two or more topics, terms or categories to determine relative buzz.

When the "buzz", or statistical measure of interest, is determined for a sponsor, that information can be used in many ways. For example, users might be interested in seeing the current popularity of a less-expensive sponsor, or determine the current quality of a more-expensive sponsor, in that the more-expensive sponsor may have a buzz in a particular region that negatively effects the value of that sponsor. Naturally, users may wish to dynamically switch their advertising campaigns to follow sponsors having increased or elevated buzz. Alternatively, a buzz value can change the value of the sponsors prior to selection, such that prices associated with particular sponsors may fluctuate in real-time.

According to another aspect of the present invention, the system may pull a user's ad campaigns from existing ad servers to provide a single location for ad campaign development and organization. Once these existing ad campaigns are brought into the system, they can be broken down, added to or integrated with those ad campaign tools provided by the present invention. For example, a user can tailor the ad templates based on existing campaigns to generate new campaigns with a particular sponsor. This methodology may allow a user to manage and track all such features from a single source or engine. It may further allow the user, via the engine as described herein, to control the trafficking of ads according to a unified set of business rules, provide coordinated ad targeting to different users or content, and centralize all tuning and optimization based on generated creatives or campaigns, or results. Further, all data related to reporting impressions, clicks, post-click and post-impression activities, and any interaction metrics can be collected and processed from the single location. It may also provide a automated and semi-automated means of optimizing bid prices, placement, targeting, or other characteristics of the ad, campaign or asset set. For example, use of a profile of prior behavior on the part of the viewer may determine which ad to develop and show. Contextual information may be developed as contained from locations where the ad will be served. Generally speaking, experimental or predictive methods may be used to explore the optimum creative for a given ad placement and for exploiting any such determination in further impressions.

A valuation methodology may be employed in accordance with the present invention in order to valuate branded entertainment transactions. The prior art currently offers no industry standard. Branded entertainment to be valuated in accordance with the present invention spans all media plays discussed herein, including air television, cable, film including but not limited to feature films, radio, music and music videos, and video games, in domestic and foreign markets, by way of non-limiting example only. Thus, as used herein throughout, the terms viewer and/or listener may be used interchangeably to refer to any recipient of any of the aforementioned media plays.

The first step in a valuation methodology is to identify the quantifiables that may be used. For example, the attributes associated with a branded media placement discussed herein throughout may include how many seconds the media placement appeared, whether it was in the foreground or background or whether the product, service, or usage appeared alone on the screen, the size and visibility of the placement, whether there was any interaction between the product, service, or usage and the actors, singers, or the like, the creative quality of the integration, the competitive images or sounds used, whether there is implied celebrity endorsement for the brand, viewer response and whether there was a visual placement or brand mention in the context of the dialogue. Ratings of the entertainment during which the placement occurred may also be used as will be evident to those possessing an ordinary skill in the pertinent arts in light of the disclosure herein. Further a brand content measuring tool may provide impact of the product integration through consumer research on the brand awareness and affinity rather than assign a dollar value to the integration.

For example, quantifiables for branded media play may include the program rating for the show during which the branded placement occurred. This quantifiable may be pinpointed process such that the rating for the minute when the product placement is accounted for and may even include the demographic profile of the viewing audience at the time the placement took place. Numerous factors may be used for the exemplary quantifiables and may be valued to the minute or even the hundredth of a second of an integration, which level of pinpointing may be selectable by one or more users of the present invention, and which such selectable pinpointing will vary in accordance with the particular quantifiable of interest. Scores for each quantifiable may be provided, such as assigning a score on a scale ranging from 1-10, for example.

Other quantifiables include predicting audience size for a given advertisers group, then defining cost based on the average rates to reach a demographic through a 30 or 60 second spot on television. A dollar value for the integration based on its forecasted audience size may then be calculated and data collected on the various characteristics of the placement. This provides a value metric that may be placed on a per-second spot, such as for a 30 second spot, for example. Metrics may be used in guiding this type of valuation, such as the cost of another television ad on the same show, for example. Such a numeric metric may be used in whole, or may be metered to account for the fact that the placement may not encompass the entire advertising spot, such as wherein the placement accounts 25% of an ad, for example. Such metering may include values as low as 1% or lower, for example, depending on the user selected pinpointing level. When placements in non-characteristic advertising markets—those where advertising spots may not be used as a metric—are used, a standard rating of cost per viewer factor, such as one ranging from $0.01-$2 may be used to value placement and sponsorship opportunities, for example.

Yet another quantifiable of fixed cost per minutes may also be used. Such fixed factors may be $1, 10, 20, or 100 CPM, for example. Such a fixed cost may also be varied based on given markets, countries and medium as would be evident to those possessing an ordinary skill in the pertinent arts. Further, predictive techniques may be used to predict audience size for advertisers or an agreement to a fixed advertising cost per thousand (CPM) based on the average rates to reach the film's demographic through a 30-second spot on television, for example. Factors similar to those discussed above may be used to vary the rate by accounting for known research parameters, viewer response to polled advertising, and comparison to similar type placements performed previously.

Quantifiables may be equally or unequally weighted, and a score for each may be translated into an overall score for the placement. Further, the quantifiables may be weighted based on known, studied, hypothesized, or other biased weighting, and then the score for each may be translated into an overall score after accounting for the weighting.

Other valuation methods may provide no value for a placement, but instead provide data on viewer response to product integrations and then translate this response into a score that advertisers may use as a quantifiable in conjunction with their own sales and marketing data to determine, for example, return on investment. Such techniques may utilize response data, such as whether the audience remembered the placement, i.e. consumer recall; whether the audience could associate the placement with the brand, i.e. brand recall; and whether the audience felt the placement represented a proper fit with the show.

Information may be compiled from selling brands worn, placed, featured or utilized in particular movies, television programs and the like to provide data that can help brands and entertainment companies put a value on these placements. A database of such information may be created that includes information on quantifiables describing the placements, as discussed hereinabove. Based on such information, and the number of viewers who either purchased, viewed or showed interest in a product that appeared gauged via an Internet-based shopping service, for example, transactional data may be logged to demonstrate whether the placements were effective in creating demand for the product. Such enhanced information may in turn lead to predictive models based on this historical transactional data to aid in determining the kinds of product placements that will be successful. Such predictive modeling may be made available to subsequent users of the present invention, such as by placement into ad templates, suggested partners, regionalized brand affinities, and the like.

As will be apparent to those skilled in the art, the engines within the endorsed advertising engine of the present invention may draw on any number of communication access points and media sources, including wired and wireless, radio and cable, telephone, television and internet, personal electronic devices, satellite, databases, data files, and the like, in order to increase content in the vault, contribute content for intelligent selection of brand associations, and best allow for recommendations and delivery.

Geo-targeting may also be utilized to manage geographically constrained or geographically targeted marketing and advertising campaigns. Those skilled in the art will understand that such campaigns may also be included as all or a portion of a campaign that is not geographically constrained, but the exemplary embodiment herein will be described with respect to a geographically constrained approach. A non-limiting example of a geographically constrained market for the purpose of discussing this exemplar embodiment is the National Football League. Under the marketing rules of the National Football League, individual teams are permitted to market their individual teams, the NFL, logos, jerseys, colors, and players, by way of non-limiting examples only, in the respectively named markets for each respective team without seeking the approval of the NFL. Therefore, in the event the geographic location of a user is identified in accordance with the present invention, a campaign or other creative may be constructed to provide specific reference to the particular NFL team having rights in the identified market of the online user, for example, without seeking approval of the NFL. Such a configuration allows real-time marketing campaigns and reduces the time necessary for creation of such campaigns.

Geo-targeted advertising according to the present invention includes determination of a user's geographical position. Such a determination identifies a geographical location within a predetermined accuracy threshold, such as by country, region, city, latitude, longitude, ZIP code, time zone, connection speed, ISP and domain, such as by using an IP address lookup database or similar technology without invading the user's privacy, for example. More specifically, in computer networking, IP addresses may not correspond to a geographic location within the desired accuracy threshold, wherein a server is not proximate to or co-located with the user, but a conversion may be performed to determine the physical location of IP addresses in many cases. Yet more specifically, geo-location may attempt to map IP addresses to geographic locations using large computer databases. For example, webmasters may use geo-location to track the geographic distribution of visitors to their site, and in addition may be able to dynamically change or block the content shown to each visitor based on location. In other embodiments of the present invention, a user's location may be assessed by cellular or other GPS or triangulation systems, by a cable television, DVR, or other set top box, by sending a "ping" signal or the like.

Once a geographical position is determined, such data may be input into the campaign creation tool. In such a tool, as the campaign is created the assessed geographical location becomes an input in determining whether a particular advertisement or spokesman may be utilized in a creative, or must be changed upon delivery of a creative to a user. Referring again to the example above, if the geographical location is determined to be a location that does not require further NFL authorization to allow delivery of a particular creative, an advertisement may be delivered that uses the colors or jersey of the Dallas Cowboys to the user in Dallas, for example. Further, such an advertisement may be designed to include the use of a Dallas player, such as Tony Romo, for example. However, rules in the Bat engine may block, limit, replace, or otherwise edit the creative for delivery to users near, or far, from Dallas. Such geo-targeting greatly increased the available spokesmen and endorsement services available in delivering online advertisements. Such geo-targeting allows for geographically constrained marketing and advertising campaigns. Further to the example described above, the Dallas Cowboys are allowed to market Dallas Cowboys, the NFL, logos, jerseys in certain named markets, such as in Dallas. Once the geographical position is determined to include these certain named markets, an advertisement with Tony Romo in his jersey may be provided without prior approval of the NFL, in the exemplary embodiment.

As would be evident to those possessing an ordinary skill in the pertinent arts, IP addresses, such as IP or DVR address, may be associated with a location in a somewhat inaccurate manner (e.g., the wrong postal code, city or suburb within a metropolitan area) to allow for the required precision for a particular creative. Similarly, IP addresses may be associated only with a very broad geographic area (e.g., a large city, or an entire state). Many precise addresses may be associated with a city, thus not allowing for assessment of a street address or latitude/longitude location. "Hotspots" may also be used, but present similar issues and often map to SSID information instead of discrete locations. Further, some addresses will not appear in an IP database, for example, and therefore cannot be mapped. In such situations, depending on the underlying licensing issues or rules selected surrounding the campaign generation, advertising may be by rule included or excluded. Using the example of the Dallas Cowboys above, if an IP address cannot be mapped into one of the specific zones that the Dallas team is eligible to advertise without prior approval, such ads may instead be handled using other aspects of the brand delivery system. Alternatively, if the mapping merely to within the city comes completely within the zone of acceptable advertising, the ad may be delivered.

Needless to say, in the event, discussed immediately hereinabove, that inadequate precision is all that is available for use with the present invention from one discrete geo-locating methodology, multiple methodologies may be employed, either hierarchically or in conjunction, in order to obtain the desired or required precision. For example, IP addressing may be used in conjunction with one or more of GPS, triangulation, hot spotting, user entered location value, set top box location, telephonic locating, computing "cookies", sending a "ping" and receiving a return, tracking of previous location (s), or the like.

Of course, the vault assets of the present invention may include assets that are, or that provide for, authenticated virtual memorabilia. Authentic virtual memorabilia assets, as used herein, may include a data object or other digital data record, kept in one or more computers, of a digital image, a method of authentication, and/or optionally a digital or digitized autograph. A digital image, as used herein, may refer to a data representation or animation of any physical object. A method of authentication, as used herein, comprises any means for verifying the authenticity, source, and uniqueness of the data object as an original or authorized object, as known to those of skill in the art of cryptography. As such, the vault assets of the present invention may include rules, permissions, licenses, and the like that will allow for the use of, and/or the authentication of, others of the vault assets.

The digital image, as part of an authentic virtual memorabilia data record, may be associated with the digital image of an autograph (a "digital autograph") of a famous person, personality, character, virtual person ("avatar") or other "individual" that increases the value of the authentic virtual memorabilia, as would a real world autograph with real world memorabilia. Digital autographs, as used herein, are intended to represent an authorized autograph used with the permission of the individual to whom that autograph belongs. Images may be captured using a digital camera, video camera, cell phone, scanner, or other method of creating a digital image of a real world object.

The system and method herein is not, limited to images of real world objects, but may be used to market assets in the form of images other limited edition virtual objects, such as art, animations, authentic logos, photographs, or other similar items or objects whose value is associated with their limited nature and verified authenticity. The system and method of the present invention may support images captured digitally, as described herein, as well as images created using graphic applications such as Photoshop, Acrobat, Flash, Amara, KoolMoves, GIF animation programs, or any other type of graphic design, editing or creation software. For example, tickets to a virtual concert, or virtual stock might be bought and sold in a marketplace based on the system of the present invention.

Authenticating an image of a digitally imaged autograph is very different than other digital signature authentication techniques. In other digital signature technologies, a combination of a public and private key is used to authenticate a digital document, such as an email or a contract. In digital signature technologies, no physical or image of an actual signature or autograph is used. The present invention may authenticate a created digital image of an autograph or signature using one or more of the methods of authentication discussed in further detail below.

Figure 24:
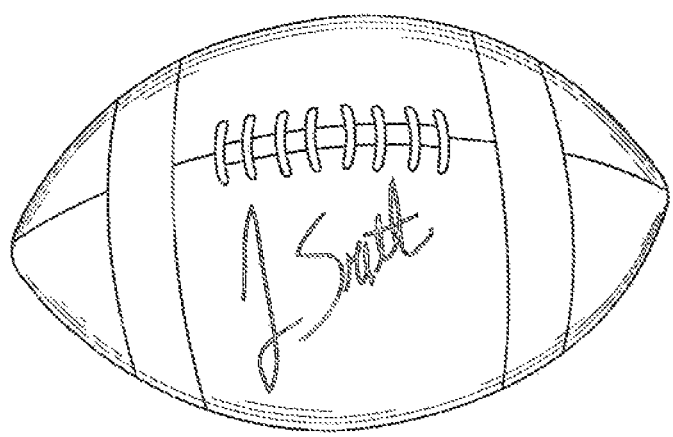
FIG. 24 is an exemplary embodiment of memorabilia associated with the present invention.

To enhance, the value of memorabilia created and traded in the present invention, in a preferred embodiment digital memorabilia will be combined with a digital autograph image, where rights to digital autograph may be granted by the signatory, or in the case of a deceased person, character or virtual person, by the authorized representative thereof. FIG. 24 illustrates an example of a digital memorabilia item combined with a digital autograph. In this case, the illustration is of an autographed virtual football autographed by NFL quarterback Joe Montana. In the system of the present invention, a preferred embodiment would require that Joe Montana authorized the use of the digital image of his autograph on that specific virtual memorabilia item.

Thus, along with storing authentication data for each piece of virtual memorabilia, the present invention may also store other relevant information for each piece of virtual memorabilia in the vault. This information may include, but is not limited to, owner's name, autographer's name, edition number, authentication information, transaction history, digital image data, autograph image data, digital rights management information, and any other information required to identify, display and authenticate the virtual memorabilia. The vault of the present invention may also store ownership information related to past and present auctions of the piece of virtual memorabilia, such as purchase price history, bid history, and other historical information regarding ownership of the piece. This information may be stored with the ownership information, or may be stored separately. The ownership information for a piece of virtual memorabilia in the system of the present invention, and as stored in the vault of the present invention, may also include item tracking information. Item tracking information may comprise item identification and chain-of-title information for each piece of virtual memorabilia. The purpose of item tracking information is to assist the system of the present invention in guaranteeing ownership of the item, and thereby to help prevent fraud, and create a secure marketplace where limited edition virtual memorabilia items may be traded, sold, or gifted with confidence.

A digital signature or digital signature scheme, not to be confused with a digital autograph as used herein, are well known in the computer arts. Digital signatures may be a type of asymmetric cryptography used to simulate the security properties of a handwritten signature on paper. Digital signature schemes normally give two algorithms, one for "signing" a data object, which involves the applying the source user's secret or private key, and one for verifying or authenticating the signature, which involves applying the user's public key. The output of the signature process is called the "digital signature."

A digital signature may be used to authentication of a data object. Digital signatures are used to create public key infrastructure (PKI) schemes in which a user's public key (whether for public-key encryption, digital signatures, or any other purpose) is tied to a user by a digital identity certificate issued by a certificate authority. PKI schemes attempt to unbreakably bind user information (name, address, phone number, etc.) to a public key, so that public keys can be used as a form of identification. Public key encryption schemes are well known in the computer arts and will not be discussed further herein.

Although data may often include information about the entity sending a message, that information may not be accurate. Digital signatures can be used to authenticate the source of messages. When ownership of a digital signature secret key is bound to a specific user, a valid signature shows that the message was sent by that user. The importance of high confidence in sender authenticity is especially obvious in context of the present invention. Memorabilia is only valuable when it is in limited supply. However, computers, by their nature, make it very simple to make copies of digital data. Thus, limited edition digital data would appear to be an oxymoron. The system and method of the present invention overcomes this challenge by using the above described authentication method, rules and systems stored within the vault in association with particular ones of the assets, or other methods well known to those of ordinary skill in the cryptograph arts, to verify that a digital image and/or digital autograph are authentic and not an illegal copy. As such, the authentication assets may be called from the vault at times not contemporaneous with the accessing of the underlying assets from the vault.

The system of the present invention may be implemented on one or more computers and software that may provide a web-based user interface. Such an interface is preferred because it is easily accessible to most potential users of the system, providing support for many platforms and operating systems. A computer system capable of supporting the present invention may include a desktop or laptop PC, including various well known input and output devices, as well as an Internet connection using one of any number of well known options such as dial-up, DSL, satellite and others. The vault for data objects of the present invention may be hosted on one or more servers connected by network means to the Internet or other type of computer network. Various devices may be used to monitor and participate in the marketplace of the present invention, including Wireless Access Protocol (WAP) cellular telephones, Internet capable Personal Data Assistants (PDAs), laptops, home computers, computers which can access the Internet via satellite from an automobile or other mobile vehicle, or any other wired or wireless means of accessing the Internet, World Wide Web (WWW), or network of the invention.

Digital images and digital autographs in the system of the present invention may be captured by various devices well known to those of ordinary skill in the art, including digital cameras, scanners, digital pens and other such devices. Digital images and digital autographs may also be created using animation software or other computer program. Web-based computer software is preferred for presenting the marketplace of the present invention because it is easily changed to adjust for changes to the system as it is upgraded or features are changed. Web-based software may provide identical or similar user interfaces across multiple platforms, reducing user interface training for users and others who may input or examine memorabilia in the system.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

What is claimed is:

1. A creative composition system, comprising:

a computer server with a tangible data storage device on which are stored a plurality of digital media assets in which prospective endorsers are identifiable to target consumers for use in creating requested endorsed advertisements and rules for their use, and a plurality of authenticated digital memorabilia each of which includes a digital image, wherein each of the media assets and the authenticated digital memorabilia is associated with a respective prospective advertisement endorser, wherein said digital memorabilia includes at least one digitalized autograph;

a communications connection operative to receive a request for an endorsed advertisement that includes information of an advertised product or service combined with a select one of the digital media assets and an offer for a select one of the digital memorabilia, wherein the select media asset and the select digital memorabilia are both associated with the same prospective endorser;

a creative composition generator operative to generate the requested endorsed advertisement in accordance with the rules for use of the select media asset;

a recommendation engine operative to recommend a sponsor for use in a requested endorsed advertisement based on an identified product or service;

an advertising wizard with which a user selects a media asset from the vault to be combined with a template to create the requested endorsed advertisement;

a delivery engine operative to deliver the template and the select media asset to a web publisher for publishing as the requested sponsored advertisement; and a database storing information of prospective sponsors including at least one of a statistic pertaining to the prospective sponsors' respective fields of distinction, the prospective sponsors' respective endorsement preferences, the prospective sponsors' respective endorsement limitations, the prospective sponsors' respective endorsement success rate, the prospective sponsors' respective sponsor geographic prominence, and the prospective sponsors' respective demographic appeal.

2. The system of claim 1, wherein the digital memorabilia further comprises authentication data for use in authentication of the memorabilia.

3. The system of claim 2, wherein the authentication comprises use of a public-key infrastructure scheme.

4. The system of claim 2, wherein the authentication data comprises at least one watermark.

5. The system of claim 2, wherein the authentication is voided based on a digital change in the memorabilia.

6. The system of claim 2, wherein the digital memorabilia further comprises a transfer record of the memorabilia.

7. The system of claim 1, wherein the digital memorabilia further comprises ownership information of the memorabilia.

8. The system of claim 7, wherein the ownership information includes at least one of owner's name, autographer name, edition number, authentication information, transaction history, digital image data, autograph image data, historical ownership information and digital rights management information.

9. The system of claim 1, wherein the digital memorabilia further comprises a purchase price history.

* * * * *